United States Patent
Aoyama et al.

(10) Patent No.: US 10,635,152 B2
(45) Date of Patent: Apr. 28, 2020

(54) INFORMATION PROCESSING APPARATUS, INFORMATION PROCESSING SYSTEM, AND INFORMATION PROCESSING METHOD

(71) Applicants: SONY MOBILE COMMUNICATIONS INC., Tokyo (JP); SONY CORPORATION, Tokyo (JP)

(72) Inventors: Ryu Aoyama, Kanagawa (JP); Tomoo Mizukami, Tokyo (JP); Yoji Hirose, Kanagawa (JP); Kei Takahashi, Tokyo (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 431 days.

(21) Appl. No.: 15/584,330

(22) Filed: May 2, 2017

(65) Prior Publication Data
US 2017/0336848 A1 Nov. 23, 2017

(30) Foreign Application Priority Data

May 18, 2016 (JP) .................... 2016-099394

(51) Int. Cl.
*G06F 1/00* (2006.01)
*G06F 1/3206* (2019.01)
(Continued)

(52) U.S. Cl.
CPC .......... *G06F 1/3206* (2013.01); *G06F 1/3234* (2013.01); *G06F 3/017* (2013.01); *G06F 3/038* (2013.01); *G06F 3/0346* (2013.01); *G06F 3/0488* (2013.01); *G06F 3/04883* (2013.01); *G06F 3/162* (2013.01); *G06F 3/167* (2013.01); *H04W 52/0254* (2013.01);
(Continued)

(58) Field of Classification Search
CPC .... G06F 1/3206; G06F 1/3234; G06F 3/0488; G06F 3/04883; G06F 3/162; G06F 3/167; G06F 1/1605; G06F 1/32; G06F 1/3215; G06F 3/0346; G06F 2203/0381; G06F 3/017; G06F 3/038; G06F 3/011; H04W 52/0254; Y02D 70/1262; Y02D 70/142; Y02D 70/144; Y02D 70/26; Y02D 70/162; Y02D 70/00
See application file for complete search history.

(56) References Cited

U.S. PATENT DOCUMENTS 10,466,795 B2 * 11/2019 Lee .................... G06F 3/167
2011/0317874 A1 12/2011 Ikenoue
(Continued)

FOREIGN PATENT DOCUMENTS

JP 2010-191826 9/2010

*Primary Examiner* — Xuxing Chen
(74) *Attorney, Agent, or Firm* — Xsensus LLP

(57) ABSTRACT

There is provided an information processing apparatus including: a process execution unit configured to execute processes relating to voice operations recognized by a voice operation recognition unit configured to recognize the voice operations on a basis of information from a voice receiving unit and gesture operations recognized by a gesture recognition unit configured to recognize user's gestures recognized on a basis of information from a sensor. The voice operation recognition unit enters a voice operation waiting state in parallel with a gesture waiting state of the gesture recognition unit.

14 Claims, 15 Drawing Sheets

| | OPERATION METHOD PERFORMED EARLIER | | |
|---|---|---|---|
| | BUTTON | GESTURE | VOICE |
| OPERATION METHOD SUBSEQUENTLY PERFORMED — BUTTON | — | BUTTON PRIORITIZED | BUTTON PRIORITIZED |
| GESTURE | BUTTON PRIORITIZED | — | VOICE PRIORITIZED |
| VOICE | BUTTON PRIORITIZED | VOICE PRIORITIZED | — |

(51) Int. Cl.
  *G06F 3/038* (2013.01)
  *G06F 3/0346* (2013.01)
  *G06F 3/01* (2006.01)
  *G06F 1/3234* (2019.01)
  *G06F 3/0488* (2013.01)
  *G06F 3/16* (2006.01)
  *H04W 52/02* (2009.01)
  *G06F 1/16* (2006.01)
  *G06F 1/32* (2019.01)
  *G06F 1/3215* (2019.01)

(52) U.S. Cl.
  CPC ............. *G06F 1/1605* (2013.01); *G06F 1/32* (2013.01); *G06F 1/3215* (2013.01); *G06F 2203/0381* (2013.01); *Y02D 70/00* (2018.01); *Y02D 70/1262* (2018.01); *Y02D 70/142* (2018.01); *Y02D 70/144* (2018.01); *Y02D 70/162* (2018.01); *Y02D 70/26* (2018.01)

(56) References Cited

U.S. PATENT DOCUMENTS

| | | | | |
|---|---|---|---|---|
| 2012/0257121 | A1* | 10/2012 | Yeh | H04N 21/4314 348/734 |
| 2013/0328767 | A1* | 12/2013 | Itoh | G06F 3/017 345/156 |
| 2015/0046886 | A1* | 2/2015 | Goel | G06K 9/00342 715/863 |
| 2015/0339098 | A1* | 11/2015 | Lee | G06F 3/167 715/728 |
| 2016/0103655 | A1* | 4/2016 | Klein | G06F 3/167 704/275 |
| 2016/0261917 | A1* | 9/2016 | Trollope | G10L 25/51 |
| 2016/0343351 | A1* | 11/2016 | Chen | G09G 5/14 |
| 2017/0332128 | A1* | 11/2017 | Jeong | H04N 21/4227 |
| 2018/0005434 | A1* | 1/2018 | Ren | G06T 17/05 |
| 2018/0239440 | A1* | 8/2018 | Noda | G06F 3/038 |

* cited by examiner

FIG. 6

| | | OPERATION METHOD PERFORMED EARLIER | | |
|---|---|---|---|---|
| | | BUTTON | GESTURE | VOICE |
| OPERATION METHOD SUBSEQUENTLY PERFORMED | BUTTON | — | BUTTON PRIORITIZED | BUTTON PRIORITIZED |
| | GESTURE | BUTTON PRIORITIZED | — | VOICE PRIORITIZED |
| | VOICE | BUTTON PRIORITIZED | VOICE PRIORITIZED | — |

INFORMATION PROCESSING APPARATUS, INFORMATION PROCESSING SYSTEM, AND INFORMATION PROCESSING METHOD

CROSS REFERENCE TO RELATED APPLICATIONS

This application claims the benefit of Japanese Priority Patent Application JP 2016-099394 filed May 18, 2016, the entire contents of which are incorporated herein by reference.

BACKGROUND

The present disclosure relates to an information processing apparatus, an information processing system, and an information processing method.

In recent years, users can operate an information processing apparatus by variety operation methods. For example, an information processing apparatus has been developed which detects a user's gesture to allow a user's operation.

JP 2010-191826A discloses an information processing apparatus which shows a user operation on the basis of the user's gesture as described above. The information processing apparatus disclosed in JP 2010-191826A includes an imaging device, and the imaging device detects the user's gesture.

SUMMARY

There are various operations on functions or applications provided in current cell-phones, which may not be covered by gesture-based operations. It is therefore desirable to use, together with gesture operation, other operation methods which are different from gesture operation.

According to an embodiment of the present disclosure, there is provided an information processing apparatus including: a process execution unit configured to execute processes relating to voice operations recognized by a voice operation recognition unit configured to recognize the voice operations on a basis of information from a voice receiving unit and gesture operations recognized by a gesture recognition unit configured to recognize user's gestures recognized on a basis of information from a sensor. The voice operation recognition unit enters a voice operation waiting state in parallel with a gesture waiting state of the gesture recognition unit.

According to an embodiment of the present disclosure, there is provided an information processing system including: a process execution unit configured to execute processes relating to voice operations recognized by a voice operation recognition unit configured to recognize the voice operations on a basis of information from a voice receiving unit and gesture operations recognized by a gesture recognition on it configured to recognize user's gestures recognized on a basis of information from a sensor. The voice operation recognition unit enters a voice operation wading state in parallel with a gesture waiting state of the gesture recognition unit.

According to an embodiment of the present disclosure, there is provided an information processing method including: executing processes relating to voice operations recognized on a basis of information front a voice receiving unit and operations relating to gestures recognized on a basis of information from a sensor, and allowing coexistence of a voice operation waiting state in which the voice operation is to be recognized, and a gesture waiting state in which the gesture is to be recognized.

According to the present disclosure discussed above, the user is allowed to perform various operations via voice operation as well as gesture operation.

Note that the effects described above are not necessarily limitative. With or in the place of the above effects, there may be achieved any one of the effects described in this specification or other effects that may be grasped from this specification.

BRIEF DESCRIPTION OF THE DRAWINGS

FIG. 6 is a diagram illustrating an exemplary processing priority in an information processing system of an embodiment of the present disclosure;

DETAILED DESCRIPTION OF THE EMBODIMENT(S)

Figure 1:
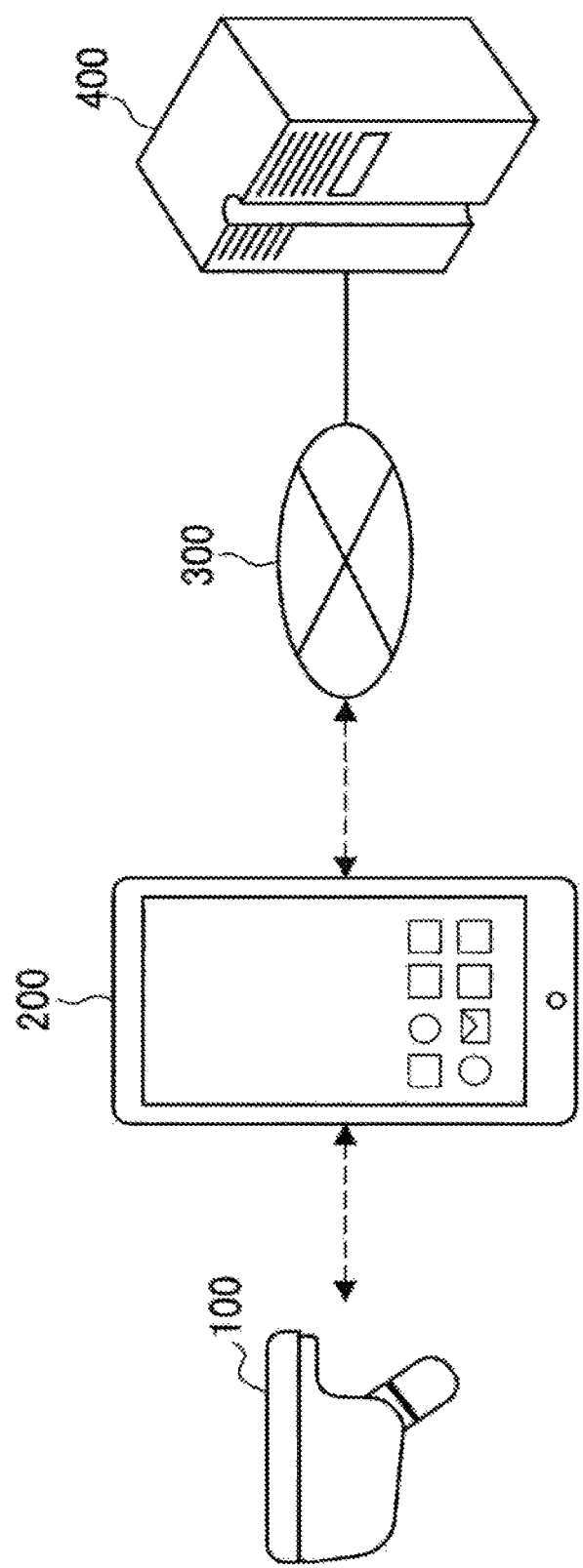
FIG. 1 is a diagram illustrating an exemplary information processing system of an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. System configuration
2. Exemplary process relating to an activation timing of a sensor for recognizing a gesture operation
3. An exemplary process in which a gesture operation is recognized in parallel with another operation method
4. An exemplary process in which a recognized gesture operation is canceled
5. An exemplars process in which a gesture operation's recognized with machine learning
6. An exemplary process in which a different operation is recognized in accordance with the strength of a gesture to be recognized
7. An exemplary process in which a timeout period is set for recognizing a gesture
8. Supplement
9. Conclusion <<1. System Configuration>>
<1-1. Outline of System Configuration>

FIG. 1 is a diagram illustrating an outline of an information processing system of an embodiment of the present disclosure. The information processing system of the embodiment of the present disclosure includes a small-size terminal 100, a cell-phone 200, a communication network 300, and a server 400. The small-size terminal 100, which is a terminal to be attached to a user's ear, is connected to the cell-phone 200 via short-distance wireless communication. The small-size terminal 100, including a loud speaker, allows the user to talk using the small-size terminal 100. The small-size terminal 100, also including buttons, allows the user to operate various functions or applications of the cell-phone 200 by operating the buttons. Note that the small-size terminal 100, the cell-phone 200, and the server 400 are exemplary information processing apparatuses.

The cell-phone 200, including a loud speaker and a microphone, can communicate with other terminals by communicating with a base station included in a mobile communication network. In addition, the cell-phone 200 includes a display unit for displaying information, as well as a touch panel formed on the display unit. A user performs various operations relating to functions or applications of the cell-phone 200 by performing operations using the touch panel. Note that the component used for operating the cell-phone 200, which is not limited to a touch panel, may be a component such as a direction key, a hard button, or a jog dial.

In addition, the cell-phone 200 has various functions and applications besides the call function, some of which may be realized by communicating with the server 400 via the communication network 300. For example, email, short message, social networking service, photography, music reproduction, browsing function, map display, and the like, may be included as types of functions and applications of the cell-phone 200.

The server 400 is connected to the cell-phone 200 via the communication network 300. The server 400 executes processes in accordance with applications or functions of the cell-phone 200. For example, the server 400 processes voice data transmitted from the cell-phone 200.

In the aforementioned system configuration, a user can operate functions of the cell-phone 200 or applications being executed in the cell-phone 200 by performing various operations on the small-size terminal 100, with the small-size terminal 100 being attached to the user's ear.

<1-2. Configuration of Small-Size Terminal>

Figure 2:
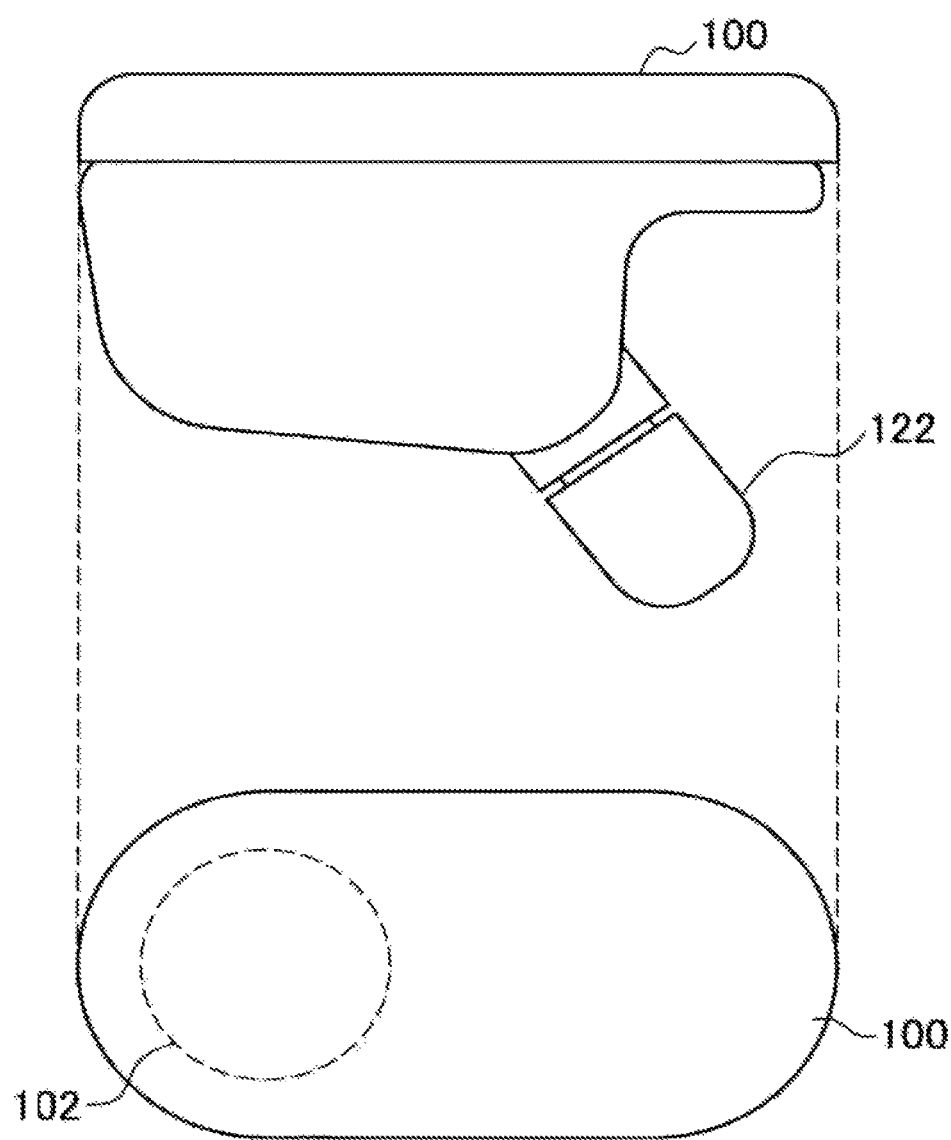
FIG. 2 is a diagram illustrating an exemplary appearance of a small-size terminal of an embodiment of the present disclosure.

The communication system of the embodiment of the present disclosure has thus been outlined above. In the following there will be described a configuration of the small-size terminal 100 of the embodiment of the present disclosure. FIG. 2 is a diagram illustrating the appearance of the small-size terminal 100. The small-size terminal 100, which is a terminal to be attached to a user's ear, has an insertion unit 122 to be inserted into the user's ear. In addition, the small-size terminal 100 has a button 102 to be operated by the user. Note that the button 102 is an exemplary operation unit.

Figure 3:
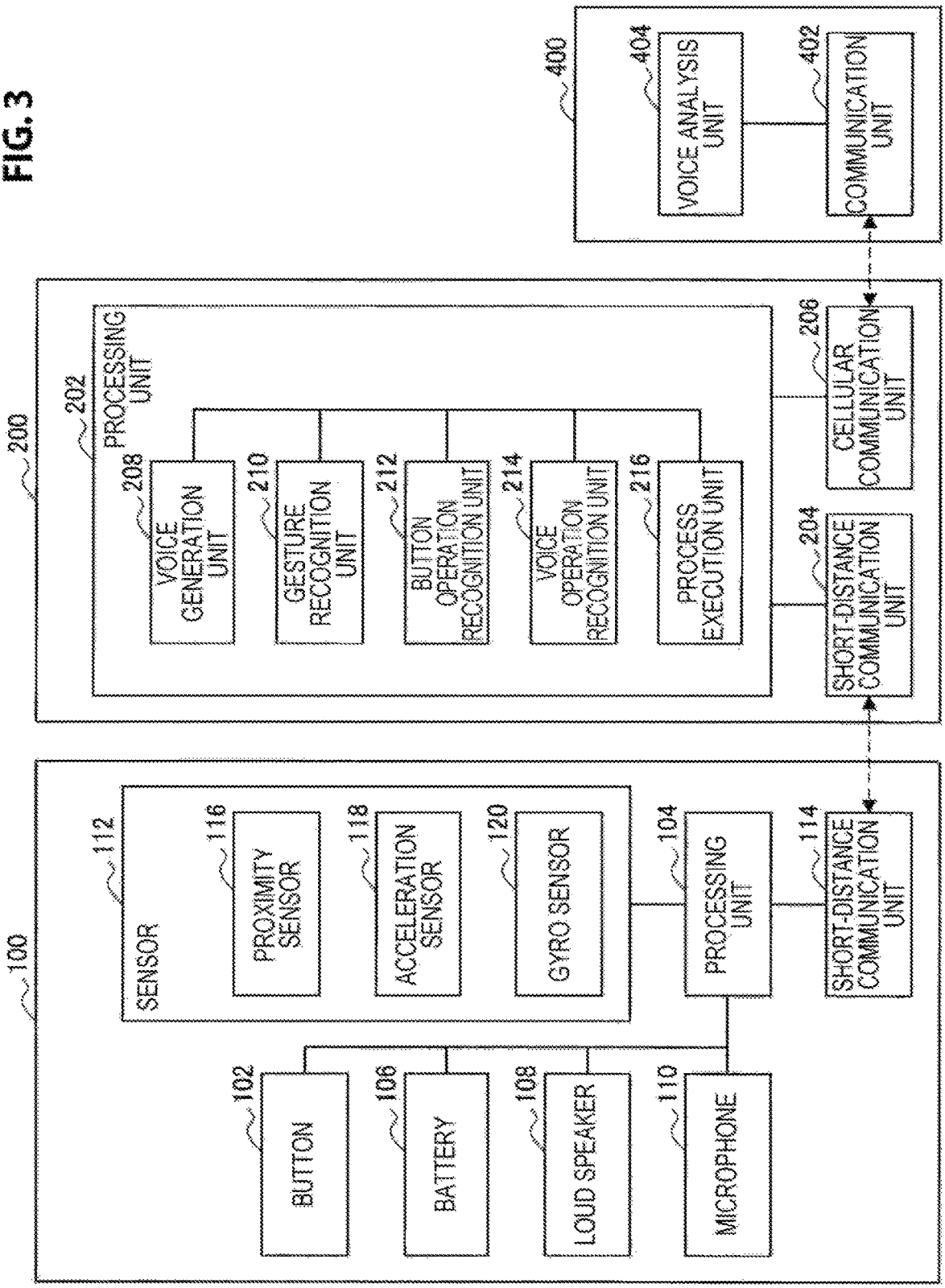
FIG. 3 is a block diagram illustrating an exemplary configuration of an information processing system of an embodiment of the present disclosure.

The appearance of the small-size terminal has been described above. In the following, there will be described a configuration of the information processing system of the present embodiment. FIG. 3 is a block diagram illustrating the configuration of the information processing system. The small-size terminal 100 includes the button 102, a processing unit 104, and a battery 106. In addition, the small-size terminal 100 includes a loud speakers 108, a microphone 110, a sensor 112, and a short-distance communication unit 114.

The user can perform a plurality of different operations on the button 102. For example, the user may press the button 102 once briefly, or twice briefly, as different operation methods performed by the user on the button 102. Alternatively, the user may press the button 102 for a predetermined time period, as a different operation method performed by user on the button 102. Note that the button 102 may be an electrostatic or a pressure-sensitive touch panel, or may be a physical key. Alternatively, there may be one or more buttons 102 the number of which is not limited. However, a smaller number of the buttons 102 are preferred due to the limited space for arranging the buttons 102 in a small-size terminal, such as the small-size terminal 100 of the present embodiment.

The processing unit 104, which is connected to each pan of the small-size terminal 100, processes information from each part. For example, the processing unit 104 detects a signal resulting from the user's operation to the button 102. In addition, the processing unit 104 processes voice data received from the cell-phone 200 via the short-distance communication unit 114, and outputs the processed voice data to the loud speaker 108. In addition, the processing unit 104 processes the voice received by the microphone 110 to generate voice data, and transmits the voice data to the cell-phone 200 via the short-distance communication unit 114.

In addition, the processing unit 104 processes a signal from the sensor 112. The sensor 112 includes a proximity sensor 116, an acceleration sensor 118, and a gyro sensor 120. The processing unit 104 detects that the small-size terminal 100 is attached to the user's ear, on the basis of a detection signal generated by the proximity sensor. In addition, the processing unit 104 processes signals output from the acceleration sensor 118 and the gyro sensor 120, and transmits the processed signal to the cell-phone 200. The battery 106 supplies electric power stored therein to each part of the small-size terminal 100, and each part operates by the supplied power.

The loud speaker 108 outputs voice on the basis of the voice data processed by the processing unit 104. When, for example, the call function is being used in the cell-phone 200, the loud speaker 108 outputs the voice of the call on the basis of voice data transmitted from the cell-phone 200. In addition, the microphone 110 receives voice and sends an audio signal to the processing unit 104. For example, the microphone 110 receives voice uttered by the user and sends an audio signal to the processing unit 104.

Note that, the proximity sensor 116 may be, for example, a proximity sensor capable of detecting a target object without touching the object. The proximity sensor may detect a target object using infrared light, supersonic wave, or electromagnetic wave, for example. In yet another example, the proximity sensor may detect a target object using variation of eddy current due to electromagnetic induction or variation of electrostatic capacitance caused by approaching of the target object.

In addition, the acceleration sensor 118 detects acceleration applied to the small-size terminal 100. When, for example, the small-size terminal 100 is attached to the user, the acceleration sensor 118 detects the acceleration when the user shakes his/her neck. There are various types of the acceleration sensor 118, such as optical or semiconductor, and the small-size terminal 100 of the present embodiment may include any type of acceleration sensor.

In addition, the gyro sensor 120 detects an angular velocity and an angular acceleration of the small-size terminal 100. When, for example, the small-size terminal 100 is attached to the user, the gyro sensor 120 detects the angular velocity and the angular acceleration when the user shakes his/her neck. There are also various types of the gyro sensor 120, such as hydraulic or optical, as with the acceleration sensor 118, and the small-size terminal 100 of the present embodiment may include any type of gyro sensor.

In addition, the short-distance communication unit 114 uses a short-distance wireless communication interface, such as Bluetooth (registered trademark), to communicate with other devices, such as the cell-phone 200. Since the small-size terminal 100 uses the low-capacity battery 106, it is preferred to use a power-saving wireless communication interface, such as Bluetooth Low Energy. Note that, the short-distance communication unit 114 is not limited to the aforementioned interface and may be a short-distance wireless communication interface such as ZigBee (registered trademark).

Note that, the small-size terminal 100 and the cell-phone 200 are connected to each other by pairing. Pairing is performed by searching for devices located within a reachable range of radio wave and selecting a device that the user wants to connect from the detected devices. As for pairing, the small-size terminal 100 and the cell-phone 200 may be configured to authenticate each other using a password. The cell-phone 200 and the small-size terminal 100 are allowed to communicate with each other by performing pairing in the aforementioned manner.

<1-3. Configuration of Cell-Phone and Server>

The configuration of the small-size terminal 100 has been described above. In the following, there will be described a configuration of the cell-phone 200 of the present embodiment. The cell-phone 200 includes a processing unit 202, a short-distance communication unit 204, and a cellular communication unit 206, as illustrated in FIG. 3. In addition, the processing unit 202 has a voice generation unit 208, a gesture recognition unit 210, a button operation recognition unit 212, a voice operation recognition unit 214, and a process execution unit 216.

The short-distance communication unit 204 uses a short-distance wireless communication interface to communicate with other devices, such as the small-size terminal 100. The short-distance communication unit 204 may be a short-distance wireless communication interface, such as Bluetooth or ZigBee as described above. The cellular communication unit 206 may be used for communicating with devices located remotely compared with the short-distance communication unit 204. For example, the cellular communication unit 206 may be an interface based on a communication standard specified by 3GPP, such as Long Term Evolution.

The voice generation unit 208 generates various voice data. When, for example a call function being executed in the cell-phone 200, the voice generation unit 208 generates voice data of the communication party. In addition, the voice generation unit 208 generates voice data based on an application being executed in the cell-phone 200. Note that, the generated voice data may be sent to the small-size terminal 100 via the short-distance communication unit 204.

The gesture recognition unit 210 recognizes the user's gesture on the basis of the signal output by the acceleration sensor 118 and/or the gyro sensor 120. A gesture may be recognized by, for example, comparing a pattern of a signal of the acceleration sensor 118 and/or the gyro sensor 120 associated with a preliminarily stored predetermined gesture with a signal output by the acceleration sensor 118 and/or the gyro sensor 120 and received by the gesture recognition unit 210. The gesture recognized by the gesture recognition unit 210 may be, for example, the user's shaking of his/her head sideways or lengthways with the small-size terminal 100 being attached to the user's ear. The gesture recognition unit 210 may recognize that the user performed an affirmative operation by shaking his/her head lengthways. Alternatively, the gesture recognition unit 210 may recognize that the user has performed a negative operation by shaking his/her head sideways.

The button operation recognition unit 212 recognizes that the user has operated the button 102 of the small-size terminal 100. For example, the user's operation of the button 102 may be recognized by sending of a button operation signal from the small-size terminal 100 the cell-phone when the user operates the button 102.

The voice operation recognition unit 214 recognizes a voice operation performed by the user. For example, the microphone 110 of the small-size terminal 100 receives the user's voice, and the small-size terminal 100 transmits the user's data to the cell-phone 200. The cell-phone 200 which has received the voice data transmits the voice data to the server 400. A voice analysis unit 404 of the server 400 analyzes the received voice data and sends an analysis result to the cell-phone 200. The voice operation recognition unit 214 recognizes the voice operation performed by the user on the basis of the received analysis result.

The process execution unit 216 executes various processes. For example, the process execution unit 216 executes an application installed in the cell-phone 200. In addition, the process execution unit 216 receives operation information from the gesture recognition unit 210, the button operation recognition unit 212, and the voice operation recognition unit 214, and performs a process based on the operation information, on the application being executed.

Note that, the analysis of voice data in the aforementioned example is performed in the voice analysis unit 404 of the server 400. However, the analysis of voice data performed in the voice analysts unit 404 of the server 400 may be performed in the voice operation recognition unit 214 of the cell-phone 200.

Note that, the gesture recognized by the gesture recognition unit 210 may be user's tilting of his/her head to the left or right. When, for example, the gesture recognition unit 210 recognizes that the user has tilted his/her head to the left or right, the process execution unit 210 may last forward or rewind a music to be reproduced in a music reproduction application. Alternatively, the gesture recognized by the gesture recognition unit 210 may be the user's pushing of his/her face forward. When, for example, the gesture recognition unit 210 recognizes that the user has pushed his/her face forward, the process execution unit 216 may magnify a photograph in a photograph display application. Alternatively, the gesture recognized by the gesture recognition unit 210 may the user's pulling of his/her face backward. When, for example, the gesture recognition unit 210 recognizes that the user has pulled his her face backward, the process execution unit 216 may shrink the photograph in the photograph display application.

<<2. Exemplary Process Relating to Art Activation Timing of a Sensor for Recognizing a Gesture Operation>>

Figure 4:
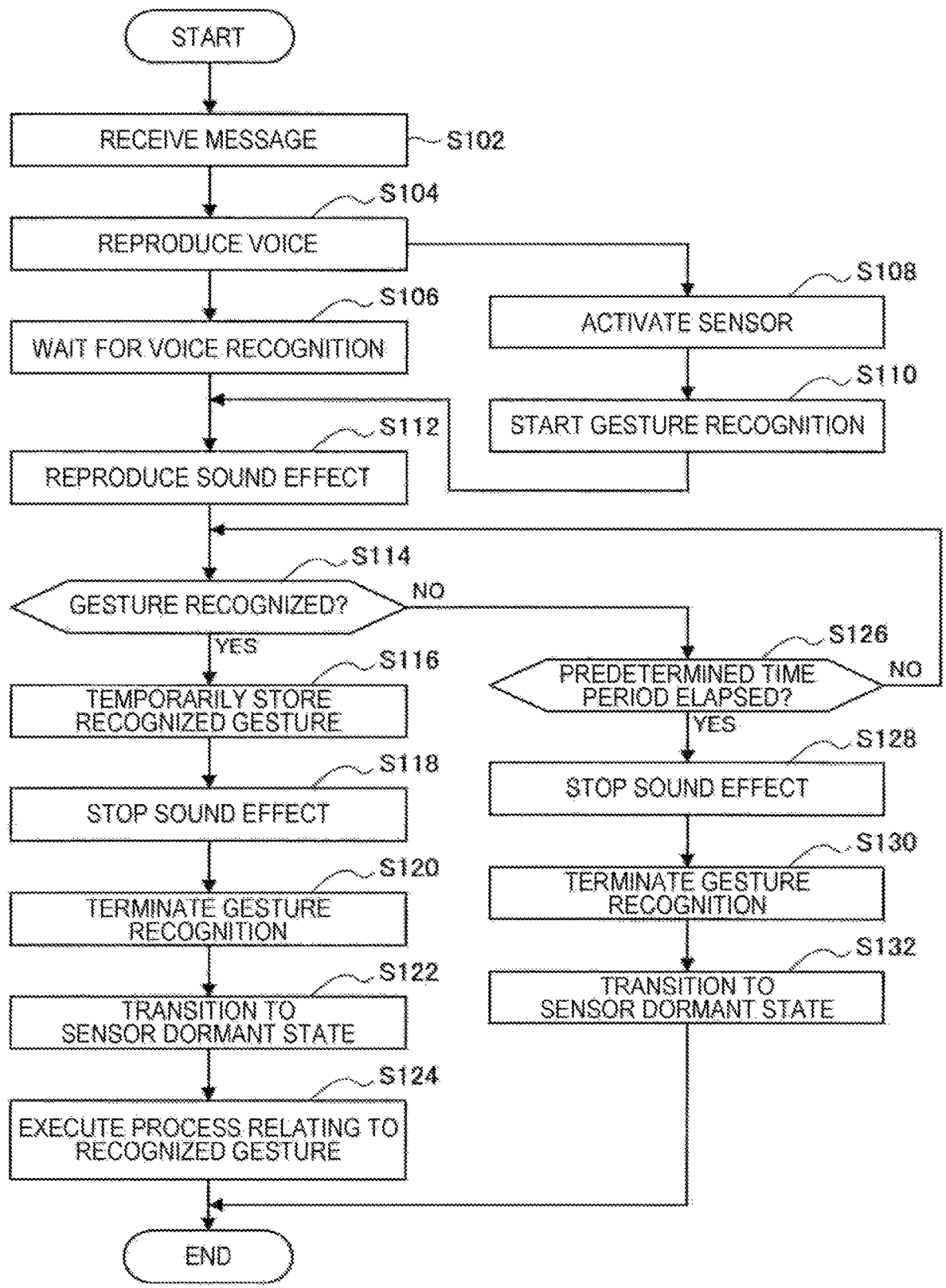
FIG. 4 is a flowchart illustrating an exemplary process in an information processing system of an embodiment of the present disclosure.

A system configuration of the present embodiment has been described above. In the following, there will be described an exemplary process in an information processing system of the present embodiment. FIG. 4 is a flowchart illustrating a timing at which the acceleration sensor 118 and/or the gyro sensor 120 to be used for gesture recognition is activated. The flowchart of FIG. 4 describes an exemplary process to be executed when she cell-phone 200 receives a message in an application, such as a short message service or a social networking service.

First, at S102, the cell-phone 200 receives a message. On this occasion, the application being executed by the process execution unit 216 sends a notification indicating message reception to the voice generation unit 208, the gesture recognition unit 210, and the voice operation recognition unit 214. Next, at S104, the voice generation unit 208 which has received the message from the application generates voice data in order to audibly notify the user of the reception of the message at S102. The cell-phone 200 then transmits the generated voice data to the small-size terminal 100, and the processing unit 104 of the small-size terminal 100 reproduces the received voice data. Here, the content of the voice data to be reproduced may be, for example, "A message has been received. Will it be read?"

At S106, the voice operation recognition unit 214 which has received the notification from the application transitions to a voice operation waiting state to wait for a voice operation from the user. In parallel with the processing at S106, the sensor of the small-size terminal 100 is activated at S108. This may be realizes by generation of an activation signal by the gesture recognition unit 210 which has received the notification from the application, and transmission of the activation signal to the small-size terminal 100.

At S108, the acceleration sensor 118 and/or the gyro sensor 120 to be used for gesture recognition are activated. At S110, the gesture recognition unit 210 transitions to a gesture waiting state to wait for a gesture operation from the user, in synchronization with the activation of the acceleration sensor 118 and/or the gyro sensor 120. Note that the activation of the acceleration sensor 118 and/or the gyro sensor 120 may be realized by sending, to the gesture recognition unit 210, information indicating that the voice operation recognition unit 214 has transitioned to the voice operation waiting state. On this occasion, the activation of the acceleration sensor 118 and/or the gyro sensor 120 synchronizes with the transition of the voice operation recognition unit 214 to the voice operation waiting state.

Next, at S112, a sound effect is reproduced indicating that the gesture recognition unit 210 is in the gesture waiting state. The sound effect allows the user to recognize when the gesture recognition unit 210 has transitioned to the gesture waiting state. Next, at S114, the gesture recognition unit 210 determines whether or not the user has performed a gesture. When the gesture recognition unit 210 recognizes a gesture at S114, the process flow proceeds to S116.

At S116, operation information relating to the gesture recognized at S114 is temporarily stored in a storage unit which is not illustrated. Next, at S118, the sound effect indicating that the gesture recognition unit 210 is in the gesture waiting state is stopped. Then, at S120, the gesture recognition unit 210 releases the gesture waiting state and terminates gesture recognition. Accordingly, the acceleration sensor 118 and/or the gyro sensor 120 transition to a dormant state at S122.

Next, at S124, the process execution unit 216 executes, on the application, a process relating to the gesture temporarily stored at S116. Specifically, when the content of the voice data reproduced as S104 is "A message has been received. Will it be read?" and the user has performed a gesture of shaking his/her head lengthways at S114, the process execution unit 216 executes a process of reading the received message at S124.

When the gesture recognition unit 210 does not recognize a gesture at S114, the process flow proceeds to S126. At S120, the gesture recognition unit 210 determines whether or not a predetermined time period has elapsed. When the gesture recognition unit 210 determines that a predetermined time period has elapsed at S126, the process flow proceeds to S128.

At S128, the sound effect indicating that the gesture recognition unit 210 is in the gesture waiting state is stopped. Then, at S130, the gesture recognition unit 210 releases the gesture waiting state and terminates gesture recognition. Accordingly, the acceleration sensor 118 and/or the gyro sensor transition to a dormant state at S132.

As been described above, the acceleration sensor 118 and or the gyro sense 120 are activated on the basis of reception of a notification indicating message reception from the application by the gesture recognition unit 210. Activating the acceleration sensor 118 and/or the gyro senior 120 on the basis of the notification from the application as thus described causes the sensor 112 to be activated at an appropriate timing with regard to the operation of the application, whereby it is possible to reduce power consumption of the small-size terminal 100. This is very advantageous for a terminal having the low-capacity battery 106, such as the small-size terminal 100.

In addition to the aforementioned processing the sensor 112 to be activated may be selected in accordance with the notification from application or the type of application. When, for example, the gesture to be recognized on the basis of the notification from application or the type of application is a simple gesture, either the acceleration sensor 118 or the gyro sensor 120 may be actuated. Alternatively, when a complicated gesture is the gesture to be recognized, both the acceleration sensor 118 and the gyro sensor 120 may be activated. On this occasion, the notification from application or the type thereof may be stored in association with the gesture to be recognized in accordance with the notification or the type.

Note that, the notification from application in the aforementioned example is a notification indicating that a message has been received. In addition, the gesture to be recognized by the notification from the application is a user's gesture of shaking his/her head lengthways (affirmative response) or a user's gesture of shaking his/her head sideways (negative response).

Alternatively, a mode of the sensor 112 to be activated may be selected on the basis of the notification from application or the type of application. The mode of the sensor 112 to be selected may be, for example, a mode having a different sampling frequency. A mode with a high sampling frequency is selected when a gesture with a fast motion is recognized, whereas a mode with a low sampling frequency is selected when a gesture with a slow motion is recognized. As thus described, selection of the sensor 112 or selection of the mode of the sensor 112 to be activated in accordance with the gesture to be recognized allows further reduction in power consumption of the small-size terminal 100.

Note that, in the aforementioned embodiment, a sound effect is reproduced at S112, which indicates that the gesture recognition unit 210 is in a gesture waiting state. However, the sound effect may be reproduced while the user is performing a gesture, i.e., while the acceleration sensor 118 and/or the gyro sensor 120 are detecting acceleration, angular velocity, or angular acceleration. Alternatively, vibration may be used instead of a sound effect to indicate that the gesture recognition unit 210 is in a gesture waiting state. Alternatively, a message may be reproduced instead of a sound effect. For example, the message may be something like "Gesture recognition will be started". Alternatively, a message may likewise be reproduced when gesture recognition is terminated. On this occasion, a message, such as "gesture recognition will be terminated", for example, may be reproduced.

Alternatively, when the user performs a voice operation instead of a gesture operation in the aforementioned exemplary process, the acceleration sensor 118 and/or the gyro sensor 120 may transition to a dormant state in synchronization with the recognition of the voice operation.

<<3. An Exemplary Process in which a Gesture Operation is Recognized in Parallel with Another Operation Method>>

Figure 5:
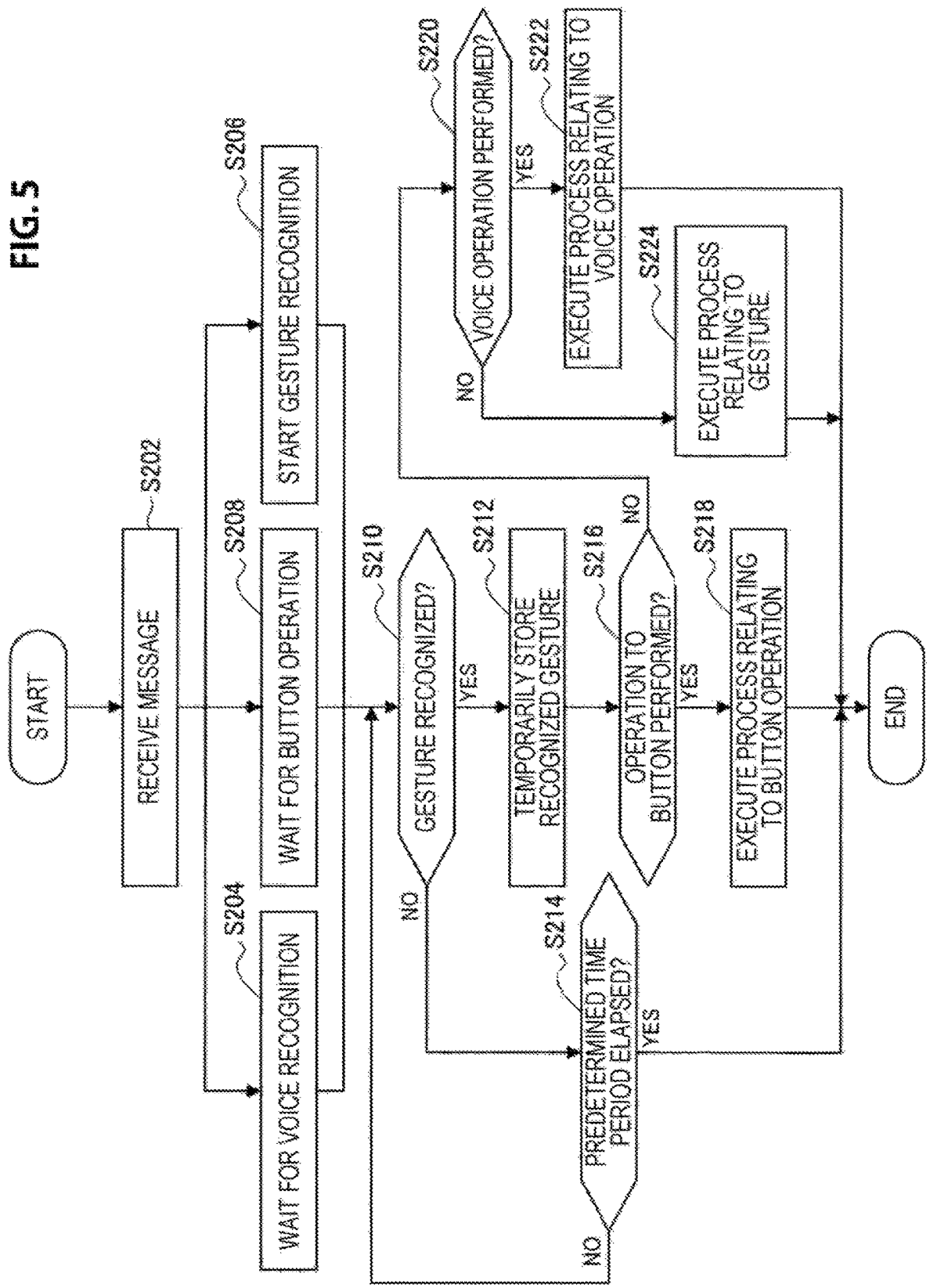
FIG. 5 is a flowchart illustrating an exemplary process in an information processing system of an embodiment of the present disclosure.

An exemplary process relating to an activation timing of the sensor 112 used for gesture operation in the present embodiment has been described above. In the following, there will be described an exemplary process of recognizing a gesture operation and another operation method. In the information processing system of the present embodiment, recognition of a voice operation and a button operation is performed in parallel with recognition of a gesture operation. Accordingly, the user can perform various operations by combining a plurality of operation methods. FIG. 5 is a diagram illustrating an exemplary process in which recognition of a voice operation and a button operation is performed in parallel with recognition of a gesture operation.

The cell-phone 200 receives a message at S202 in a similar manner to the exemplary process in FIG. 4. Next, at S204, the voice operation recognition unit 214 transitions to a voice operation waiting state to wait for a voice operation from the user, on the basis of reception of a notification indicating that a message has been received from an application.

In parallel with the processing at S204, the acceleration sensor 118 and/or the gyro sensor 120 of the small-size terminal 100 are activated at S206, and the gesture recognition unit 210 transitions to a gesture waiting state to wait for a gesture operation from the user. Additionally, in parallel with the processing at S204 and S206, the button operation recognition unit 212 transitions to a button operation waiting state to wait for a button operation from the user (S208).

Then, at S210, the gesture recognition unit 210 determines whether or not the user has performed a gesture.

When the gesture recognition unit 210 recognizes a gesture at S210, the process flow proceeds to S212. At S212, operation information relating to the gesture recognized at S210 is temporarily stored. Note that, when the gesture recognition unit 210 does not recognize a gesture at S210, the process flow proceeds to S214. At S214, the gesture recognition unit 210 determines whether or not a predetermined time period has elapsed. When the gesture recognition unit 210 determines at S214 that a predetermined time period has elapsed, the process is terminated.

Next, at S216, the button operation recognition unit 212 determines whether or not the user has operated the button 102. When the button operation recognition unit 212 recognizes at S216 that the user has operated the button 102, the button operation recognition unit 212 sends operation information relating to a button operation to the process execution unit 216, and the process execution unit 216 executes a process relating to the button operation (S218).

When the button operation recognition unit 212 does not recognize at S216 that the user has operated the button 102, the process flow proceeds to S220. At S220, the voice operation recognition unit 214 determines whether or not the user has performed a voice operation. When the voice operation recognition unit 214 recognizes at S220 that the user has performed a voice operation, the voice operation recognition unit 214 sends operation information relating to the voice operation to the process execution unit 216, and the process execution unit 216 executes a process relating to the voice operation (S222).

When the voice operation recognition unit 214 does not recognize at S220 that the user has performed a voice operation, the process flow proceeds to S224. At S224, the gesture recognition unit 210 sends operation information relating to the gesture temporarily stored at S212 to the process execution unit 216, and the process execution unit 216 executes a process relating to the gesture operation.

An exemplary process when gesture operation is performed first has been described above. However, the order of performing operations is not limited to the example described in FIG. 5 FIG. 6 is a diagram illustrating a relation between an operation method performed earlier and an operation method subsequently performed.

First, there will be described a relation with another operation method in a case where a button operation is performed earlier. When a button operation is performed earlier and subsequently a gesture operation is performed, a process relating to the button operation is executed in preference to the gesture operation. On this occasion, a sound effect indicating that the gesture recognition unit 210 is in a gesture waiting state may be stopped at the time point when button operation is performed. Similarly, when a button operation is performed earlier and subsequently a voice operation is performed, a process relating to the button operation is executed in preference to the voice operation.

Next, there will be described a relation with another operation method in a case where a gesture operation is performed earlier. When a gesture operation is performed earlier and subsequently a button operation is performed, a process relating to the button operation is executed in preference to the gesture operation. Similarly, when a gesture operation is performed earlier and subsequently a voice operation is performed, a process relating to the voice operation is executed in preference to the gesture operation.

Next, there will be described a relation with another operation method in a case where a voice operation is performed earlier. When a voice operation is performed earlier and subsequently a button operation is performed, a process relating to the button operation is executed in preference to the voice operation. Similarly, when a voice operation is performed earlier and subsequently a gesture operation is performed, a process relating to the voice operation is executed in preference to the gesture operation.

The priority of each operation method is not limited to the aforementioned example. In addition, the priority of each operation method may be changed. For example, weighting is performed on each operation method, and the process execution unit 216 may execute a process relating to each operation method in consideration of the weighting. The weighting of each operation method may be set by the user. Alternatively, weighting of each operation method may be set in accordance with the recognition precision of each operation method.

Note that, respective operation methods described above may be used in combination. For example a button operation may be combined with a gesture operation. When a music reproduction application is being executed by the process execution unit 216, the user's tilting of his/her head to the right while touching the button 102 may allow the process execution unit 216 to execute a process of reproducing the next music.

Alternatively, a voice operation may be combined with a gesture operation. When a message application is being executed by the process execution unit 216, the user's shaking of his/her head lengthways while uttering "OK." may allow the process execution unit 216 to input the letters "OK" in an emphasized manner. In addition, the process execution unit may input an image (stamp) corresponding to the letters "OK" instead of the process of emphasizing the letters.

Alternatively, a voice operation may be combined with a button operation. When a message application is being executed by the process execution unit 216, the user's uttering "OK" while touching the button 102 may allow the process execution unit 216 to input the letters "OK" in an emphasized manner. Alternatively, the process execution unit 216 may input an image (stamp) corresponding to the letters "OK" instead of the process of emphasizing the letters.

In the information processing system of the present embodiment described above, a gesture operation, a voice operation, and a button operation are performed in parallel. Accordingly, the user can perform various operations using a plurality of operation methods.

<<4. An Exemplary Process in which a Recognized Gesture Operation is Canceled>>

Figure 7:
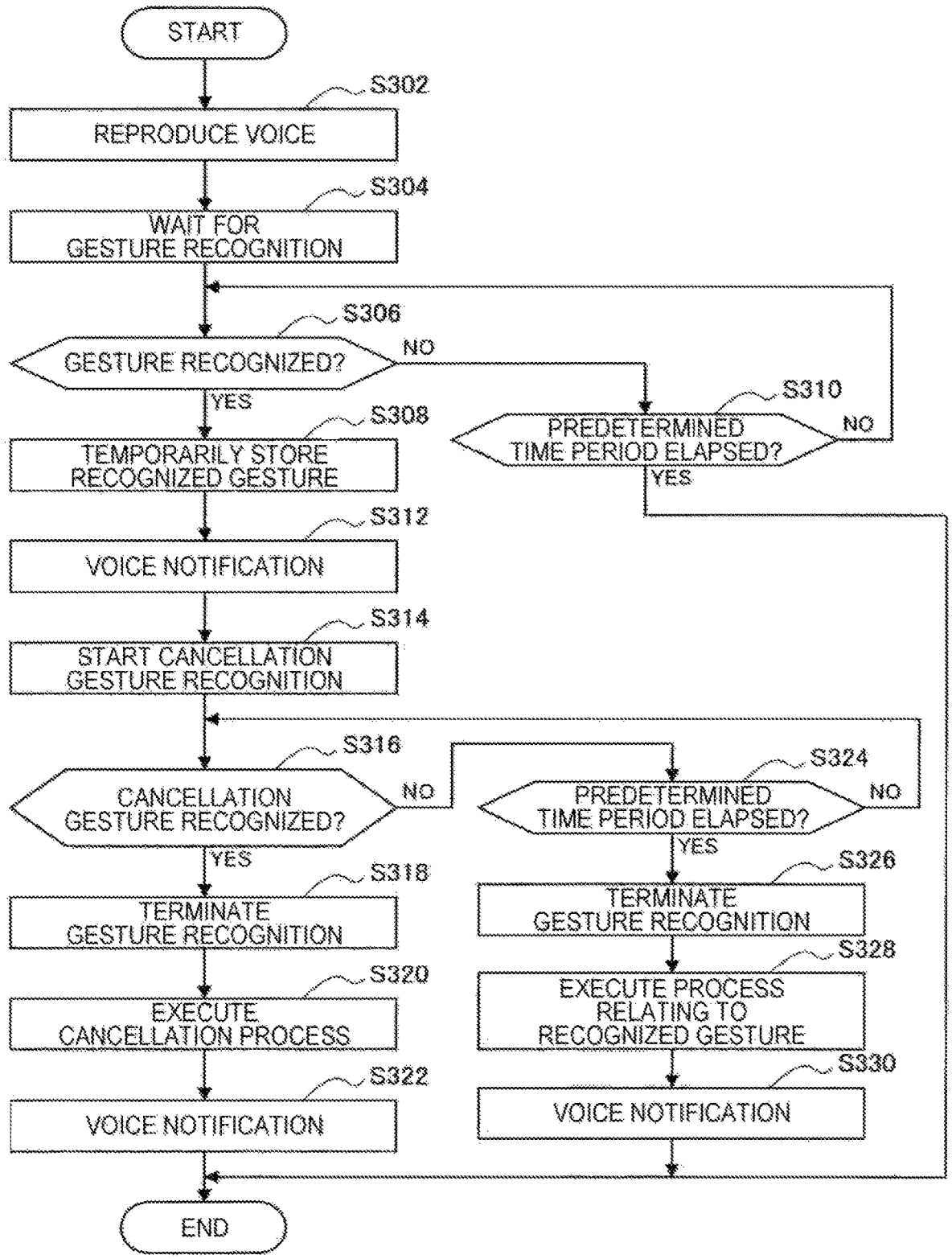
FIG. 7 is a flowchart illustrating an exemplary process in an information processing system of an embodiment of the present disclosure.

An exemplary process in which a gesture operation, a voice operation, and a button operation are performed in parallel has been described above. In the following, these will be described an exemplary process of canceling a gesture operation. There is a possibility of misrecognizing a gesture operation and therefore it is preferred to prepare a process of canceling the recognized gesture operation. FIG. 7 is a diagram illustrating an exemplary process in which a recognized gesture operation is canceled. In FIG. 7, there will be described an exemplary process when sending back a message in a message application.

At S302 the small-size terminal 100 reproduces a voice "Reply with OK?", for example, in order to cause the user to determine whether or not to reply to a message. At S306, the gesture recognition unit 210 transitions to a gesture waiting state to wait for a gesture operation from the user.

Then, at S306, the gesture recognition unit 210 determines whether or not the user has performed a gesture. When the gesture recognition unit 210 recognizes a gesture at S306, the process flow proceeds to S308. Note that, in the following, there will be described an exemplary process in a case where the gesture recognized at S306 is the user's gesture of shaking his/her head lengthways (nod).

At S308, the gesture recognition unit 210 sends operation information relating to the gesture recognized at S306 to the process execution unit 216, and the process execution unit 216 stores the operation information relating to the recognized gesture. Note that, when the gesture, recognition unit 210 does not recognize a gesture at S306, the process flow proceeds to S310. At S310, the gesture recognition unit 210 determines whether or not a predetermined time period has elapsed. When the gesture recognition unit 210 determines at S310 that a predetermined time period has elapsed, the process is terminated.

Next, at S312, a voice notification is performed on the basis of the gesture recognized at S306. When the gesture recognized at S306 is a gesture relating to a "nod" indicating an affirmative response, a voice notification such as "Reply in three seconds", for example, is performed at S312.

Next, at S314 the gesture recognition unit 210 transitions to a cancellation gesture waiting state to recognize a cancellation gesture for canceling the operation relating to the gesture recognized at S306. For example, the cancellation gesture may be the user's gesture of shaking his/her head sideways. Here, the cancellation gesture is a predetermined specific gesture.

Next at S316, the gesture recognition unit 210 determines whether or not the user has performed a cancellation gesture. When the gesture recognition unit 210 recognizes a cancellation gesture at S316, the gesture recognition unit 210 terminates gesture recognition (S318). Then, at S320, the gesture recognition unit 210 sends operation information relating to the cancellation gesture recognized at S316 to the process execution unit 216, and the process execution unit 216 executes a cancellation process. Specifically, the process execution unit 216 does not execute the process relating to the gesture stored at S308. In other words, the operation relating to the gesture recognized at S306 is canceled. Then, at S322, the small-size terminal 100 performs voice notification in order to notify the user that the operation recognized at S306 has been canceled. The content of the voice reproduced at S322 may be, for example, "Reply canceled".

When the gesture recognition unit 210 does not recognize a cancellation gesture at S316, the process flow proceeds to S324. At S324, the gesture recognition unit 210 determines whether or not a predetermined time period has elapsed. The time period at S324 is a cancellation period set for the user to cancel the operation relating to the gesture recognized at S306. Further, during the cancellation period, the process execution unit 216 waits for an input of operation information relating to the cancellation gesture from the gesture recognition unit 210.

When the gesture recognition unit 210 determines at S324 that a predetermined time period has elapsed, the process flow proceeds to S326. At S326, the gesture recognition unit 210 terminates gesture recognition and notifies the process execution unit 216 that the cancellation period has elapsed. Then, at S328, the process execution unit 216 executes a process relating to the gesture stored at S308. At S330, a voice notification such as "replied", for example, is performed in order to indicate that a process relating to the gesture operation performed by the user at S306 has been performed.

Note that, the process execution unit 216 may dynamically set the length of the cancellation period for waiting for an input of operation information relating to the cancellation gesture from the gesture recognition unit 210. For example, the process execution unit 216 may set the length of the cancellation period on the basis of information acquired from an application being executed.

On this occasion, the process execution unit 216 may set the length of the cancellation period on the basis of the type of the application being executed. For example, the process execution unit 216 may set the length of the cancellation period to be long for a message transmission and reception application, and set the length of the cancellation period to be short for a music reproduction application. This is because, in transmission of a message, the user may transmit important information and therefore the user determines transmission of a message more carefully. On the other hand, this is because the user suffers no significant disadvantage even if the user performs an erroneous operation in music reproduction. Accordingly, there is set a cancellation period of an appropriate length in accordance with the type of the application being executed.

Alternatively, the process execution unit 216 may set the length of the cancellation period on the basis of the state of the application being executed. For example, the process execution unit 216 may set the length of the cancellation period to be long for an operation that terminates moving image photographing in a moving image photographing application, and set the length of the cancellation period to be short for an operation that starts moving image photographing. In other words, the process execution unit 216 sets different lengths for the cancellation periods for an operation in a state before starting moving image photographing and an operation in a state during moving image photographing. This is because, it is generally expected to photograph the motion of the subject quickly when starting moving image photographing whereas, when terminating moving image photographing, it suffices to later delete a moving image photographed for an unnecessarily long time. Accordingly, there is set a cancellation period of an appropriate length in accordance with the state of the application being executed.

Alternatively, the process execution unit 216 may set the length of the cancellation period on the basis of the type of the notification of the application being executed. For example, in a message transmission and reception application, the process execution unit 216 may set the length of the cancellation period to be long for an operation to a notification asking the user whether or not to transmit a message, and set the length of the cancellation period to be short for an operation to a notification asking the user whether or not to read a message. This is because the user determines transmission of a message more carefully, whereas the user suffers no significant disadvantage even if the user performs an erroneous operation when reading a message. Accordingly, there is set a cancellation period of an appropriate length in accordance with the type of the notification of the application being executed.

Alternatively, the process execution unit 216 may set the length of the cancellation period on the basis of the magnitude of acceleration, angular velocity, or angular acceleration acquired from the acceleration sensor 118 and the gyro sensor 120. For example, when the acceleration, angular velocity, or angular acceleration acquired from the acceleration sensor 118 and the gyro sensor 120 is large, the process execution unit 216 determines that user is moving and sets the length of the cancellation period to be long. This is because, the user performs many erroneous operations when moving. Accordingly, there is set a cancellation period of an appropriate length in accordance with the user's moving state.

Alternatively, the user may set the cancellation period by operating the operation unit of the cell-phone 200. Alternatively, the cancellation period may not be provided depending on type or state of application, or notification from application. This is because it is preferred that no cancellation period is provided for an operation desired to be performed quickly. For example, it is desirable that no cancellation period is provided for a notification "music to be reproduced?" from the application so that a process relating to the operation is immediately performed.

Further, in FIG. 7, cancellation of a gesture operation is performed by a gesture operation. However, cancellation of an operation is not limited thereto. For example, cancellation of an operation may be performed by a button operation. On this occasion, the user may hold down the button 102 during the cancellation period to cause the button operation recognition unit 212 to send operation information to the process execution unit 216, and the process execution unit 216 which has received the operation information may cancel the operation. Alternatively, cancellation of an operation may be performed by a voice operation. On this occasion, the user may utter "no" during the cancellation period to cause the voice operation recognition unit 214 to send operation information to the process execution unit 216, and the process execution unit 216 which has received the operation information may cancel the operation.

Alternatively, the operation information relating to the cancellation gesture at S316 may be generated when the gesture recognition unit 210 detects acceleration, angular velocity, or angular acceleration equal to or higher than a determined value. For example, a cancellation gesture may be performed by the user's fierce shaking of his/her head sideways. Accordingly, erroneous cancellation operations may be reduced.

An exemplary process of canceling a recognized gesture operation has been described above. Accordingly, in a case where a gesture operation has been misrecognized or the user has performed an erroneous operation, the user can cancel the once-recognized gesture operation.

Alternatively, the process to be canceled in the aforementioned example may be other than a process relating to a gesture operation. For example, a process relating to a recognized voice operation may be canceled by recognition of a cancellation gesture after the voice operation has been recognized. Alternatively, a process relating to a recognized button operation may be canceled by recognition of a cancellation gesture after the button operation has been recognized.

<<5. An Exemplary Process in which a Gesture Operation is Recognized with Machine Learning>>

An exemplary process to cancel a recognized gesture operation has been described above. In the following, there will be described an exemplary process of recognizing a gesture operation using a result of learning by machine learning. In recognition of a gesture operation, the precision of recognition may be raised by use of a result of learning by machine learning. However, the recognition precision of a gesture operation with machine learning may be insufficient. Therefore, the information processing system of the present embodiment performs recognition of a gesture operation on the basis of a particular rule, in addition to recognition of a gesture operation by machine learning.

Figure 8:
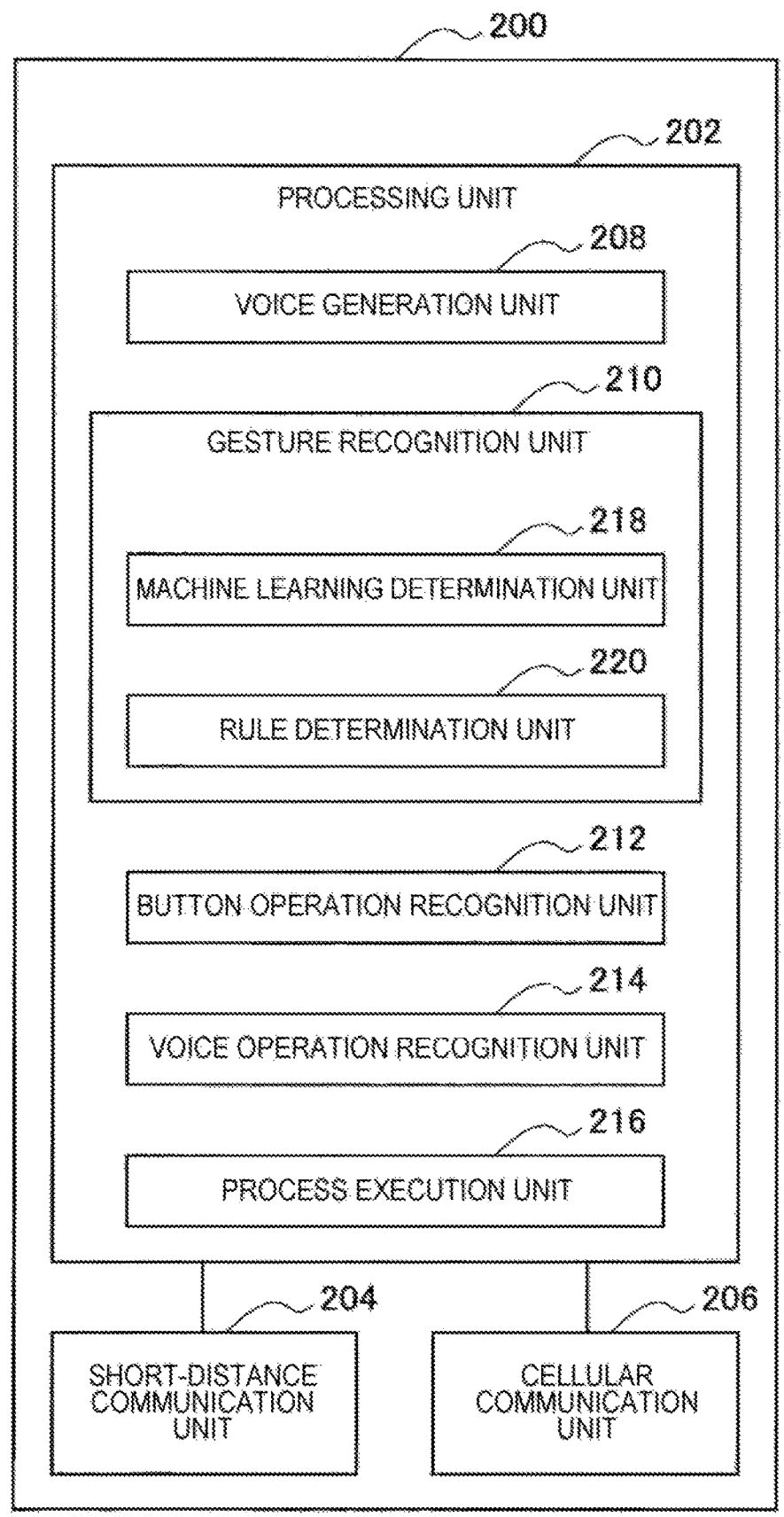
FIG. 8 is a block diagram illustrating another exemplary configuration of a cell-phone of an embodiment of the present disclosure.

FIG. 8 is a block diagram illustrating another exemplary configuration of the cell-phone 200 of the present embodiment. The gesture recognition unit 210 of the cell-phone 200 in the present embodiment has a machine learning determination unit 218 and a rule determination unit 220. The machine learning determination unit 218 performs recognition of a gesture using a result of learning performed by machine learning. On the other hand, the rule determination unit 220 performs recognition of a gesture on the basis of a predetermined rule.

Figure 9:
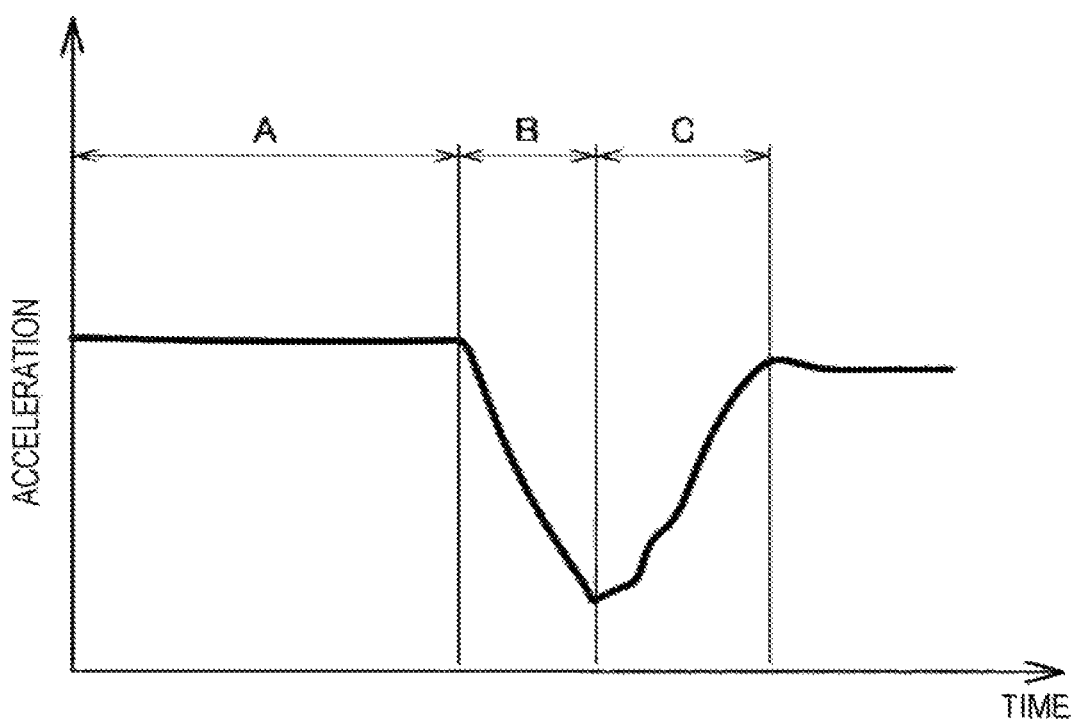
FIG. 9 is a diagram illustrating an exemplary acceleration detected by a sensor provided in a small-size terminal of an embodiment of the present disclosure.

FIG. 9 is a diagram illustrating a pattern of acceleration detected by the acceleration sensor 118 when the user nods. In a range A of FIG. 9 before the user nods, the acceleration detected by the acceleration sensor 118 is constant. In a range B of FIG. 9 when the user shakes his/her head downward, the acceleration sensor 118 detects a monotonously decreasing acceleration. In a range C of FIG. 9 when the user shakes his/her head upward, the acceleration sensor 118 detects acceleration of an approximately same magnitude in a direction opposite to a direction in the range B.

Figure 10:
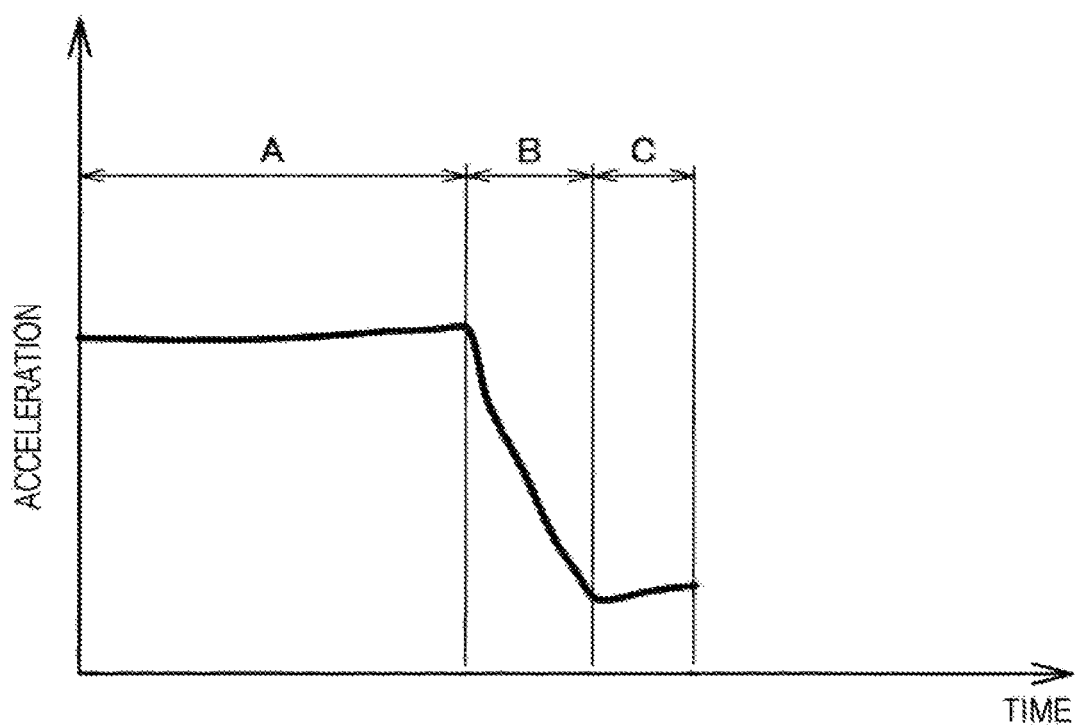
FIG. 10 is a diagram illustrating another exemplary acceleration detected by a sensor provided in a small-size terminal of an embodiment of the present disclosure.

FIG. 10 is a diagram illustrating a pattern of acceleration detected by the acceleration sensor 118 when the user suddenly looks down. The acceleration pattern of FIG. 10 is similar to the acceleration pattern of FIG. 9 across the ranges A to B. In the acceleration pattern in range C of FIG. 10, however, acceleration is not detected in the direction opposite to the direction in the range B.

The rule determination unit 220 preliminarily stores the acceleration pattern illustrated in FIG. 9, for example, as a rule of the user's nodding gesture. The rule determination unit 220 then compares the stored acceleration pattern with an acceleration pattern detected by the acceleration sensor 118 to perform recognition of a gesture. In other words, the rule determination unit 220 does not perform gesture recognition because the acceleration pattern illustrated in FIG. 10 is different from the stored acceleration pattern.

The aforementioned rule will be described more specifically in the following. For example, acceleration before starting a gesture is set as (x0, y0, z0), and acceleration when terminating the gesture is set as (x1, y1, z1). The rule determination unit 220 may use as a rule that the value of difference |(x1−x0), (y1−y0), (z1−z0)| between magnitudes of the two accelerations is equal to or smaller than a predetermined threshold value.

Figure 11:
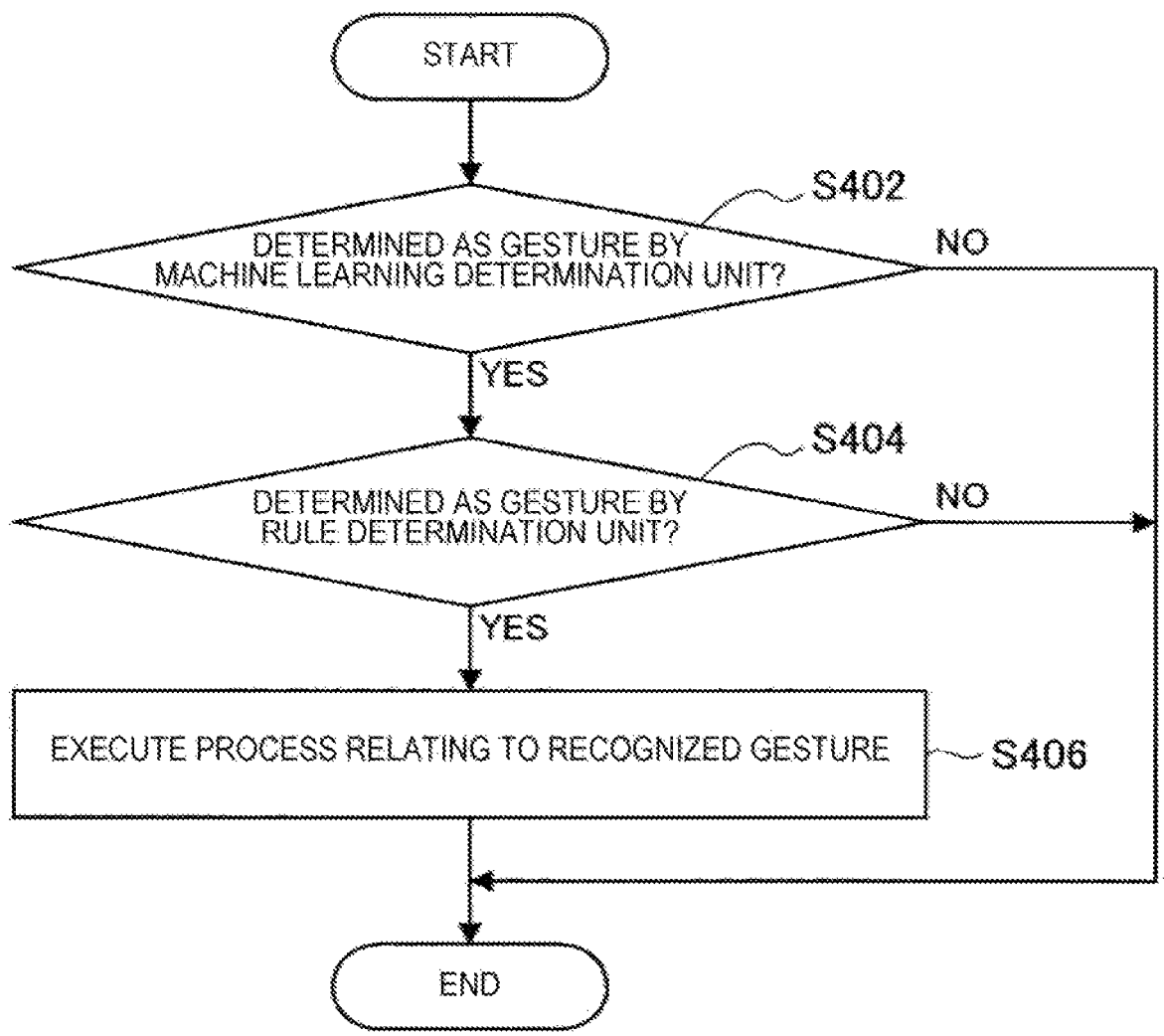
FIG. 11 is a flowchart illustrating an exemplary process in an information processing system of an embodiment of the present disclosure.

FIG. 11 is a flowchart illustrating an exemplary gesture recognition process to be executed by the gesture recognition unit 210 of the present embodiment. First, at S402, the machine learning determination unit 218 performs gesture recognition on the basis of a result of learning with machine learning. When the machine learning determination unit 218 recognizes a gesture at S402, the process flow proceeds to S404. At S404, the rule determination unit 220 performs gesture recognition on the basis of a predetermined rule, independently of the machine learning determination unit 218. Note that, when the machine learning determination unit 218 does not recognize a gesture at S402, the process is terminated.

When the rule determination unit 220 recognizes a gesture at S404, the process flow proceeds to S406. At S406, the gesture recognition unit 210 sends operation information relating to the recognized gesture to the process execution unit 216, and the process execution unit 216 executes a process relating to the recognized gesture. When the rule determination unit 220 does not recognize a gesture at S404, the process is terminated. On this occasion, the process execution unit 216 does not execute a process relating to the gesture recognized by the machine learning determination unit 218 at S402.

As has been described above, a gesture is recognized by the machine learning determination unit 218 and the rule determination unit 220 in the gesture recognition unit 210 of the present embodiment. Accordingly, misrecognition of gestures by machine learning is reduced.

<<6. An Exemplary Process in which a Different Operation is Recognized in Accordance with the Strength of a Gesture to be Recognized>>

An exemplary process in which a gesture is recognized on the basis of a result of learning with machine learning and a predetermined rule has been described above. In the following, there will be described an exemplary process in which the operation to the recognized gesture varies in accordance with the strength of the gesture to be recognized. For example, the user may fiercely shake his/her head sideways when expressing strong negation, or may slowly shake his/her head sideways when expressing weak negation. In the information processing system of the present embodiment, the user can perform different operations in accordance with the strength of such gestures.

Figure 12:
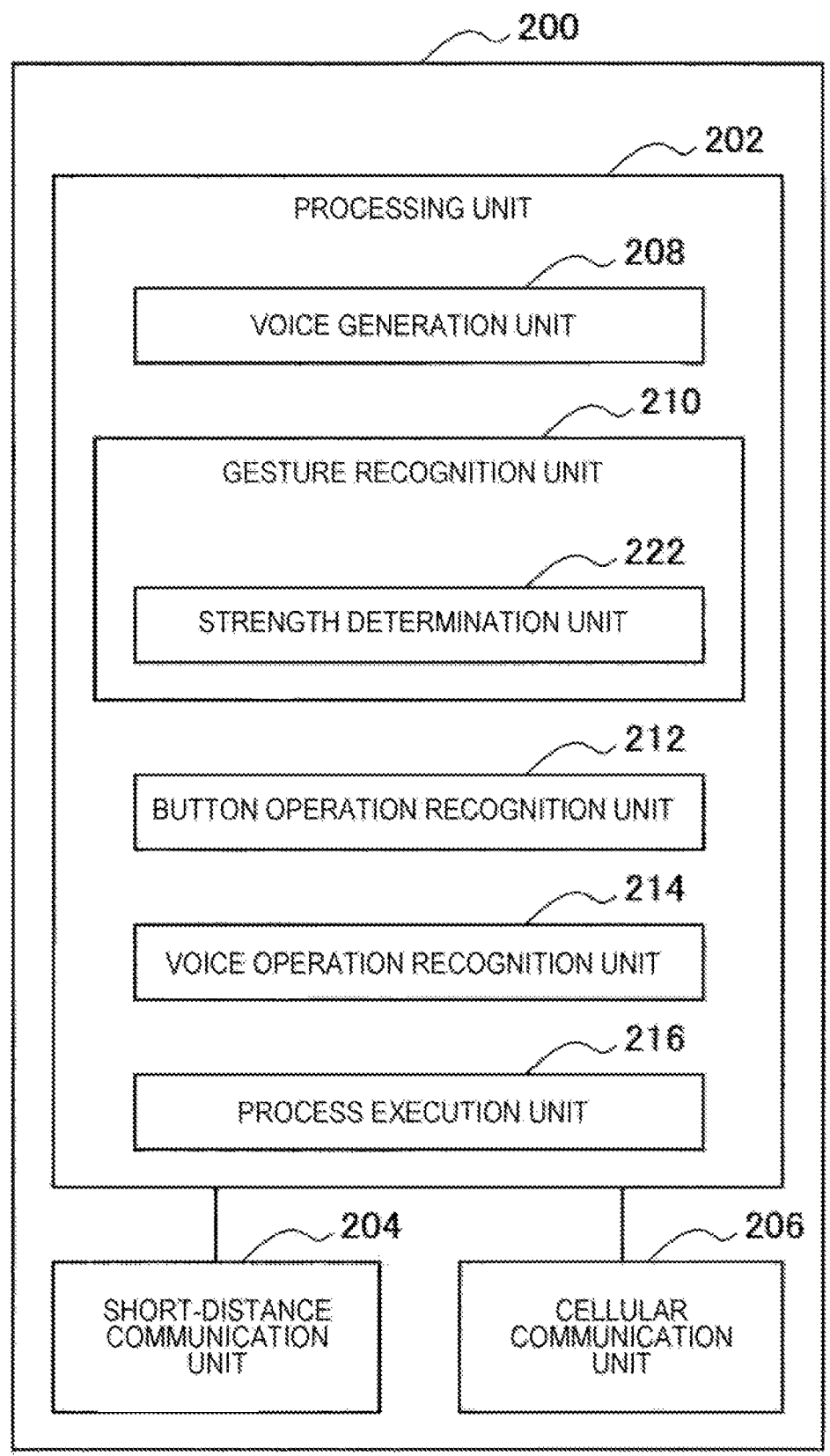
FIG. 12 is a block diagram illustrating another exemplary configuration of a cell-phone of an embodiment of the present disclosure.

FIG. 12 is a block diagram illustrating a configuration of the cell-phone 200 of the present embodiment. The gesture recognition unit 210 of the cell-phone 200 in the present embodiment has a strength determination unit 222. The strength determination unit 222 recognizes a first gesture when the acceleration, angular velocity, or angular acceleration detected by the acceleration sensor 118 or the gyro sensor 120 is smaller than a predetermined magnitude. In addition, the strength determination unit 222 recognizes a second gesture when the acceleration, angular velocity, or angular acceleration is larger than a predetermined magnitude.

Figure 13:
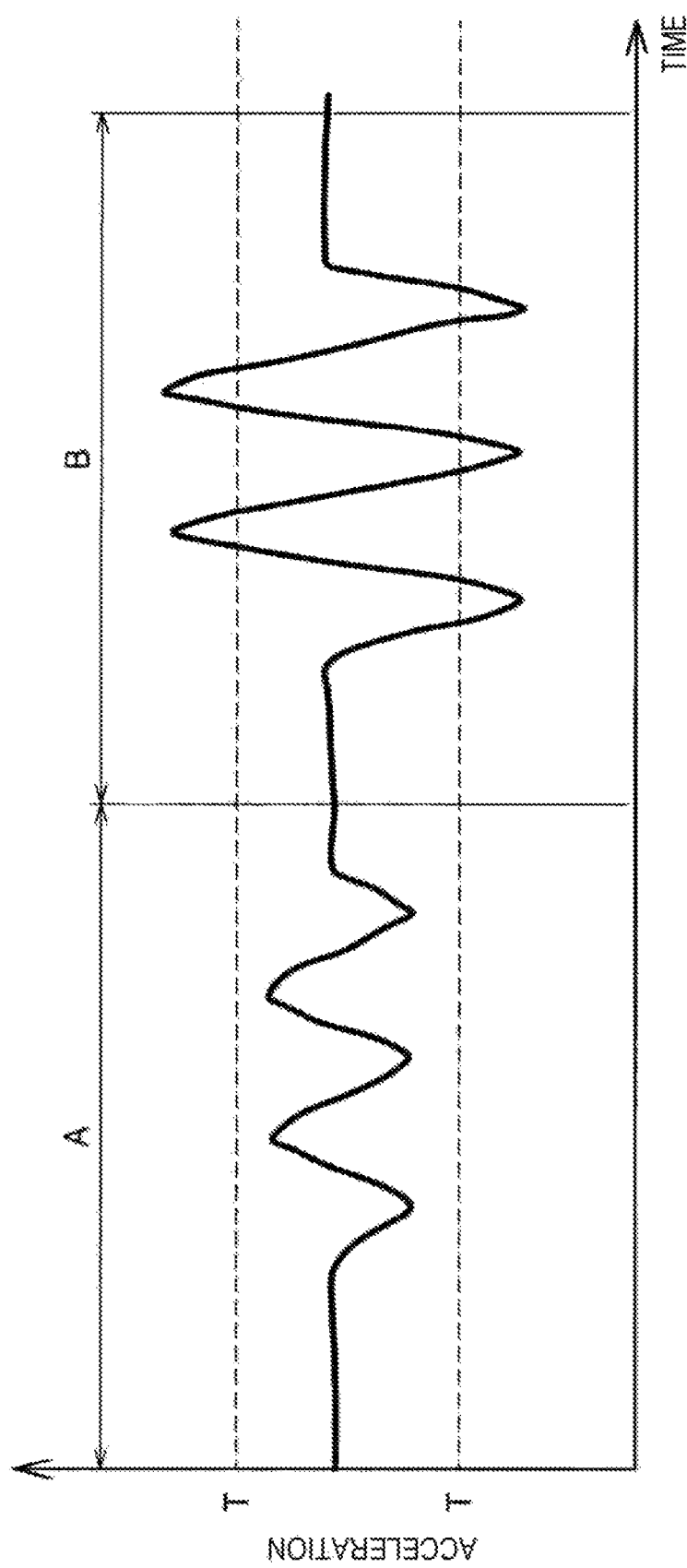
FIG. 13 is a diagram illustrating a threshold value being set for acceleration detected by a sensor provided in a small-size terminal of an embodiment of the present disclosure.

FIG. 13 is a diagram illustrating a pattern of acceleration of the first gesture and the second gesture recognized by the gesture recognition unit 210 of the present embodiment. Here, the predetermined magnitude of acceleration used for discriminating the aforementioned first gesture and second gesture is expressed by a threshold value T. Therefore, a gesture recognized in a range A of FIG. 13 is the first gesture, and a gesture recognized in a range B is the second gesture. Note that, in the following, there will be described an example in which different gesture operations are performed in accordance with the magnitude of acceleration detected by the acceleration sensor 118.

When the user slowly shakes his/her head sideways, the acceleration sensor 118 detects acceleration of a magnitude that does not exceed the threshold value T, as illustrated in the range A of FIG. 13. The gesture recognition unit 210 recognizes the gesture as the last gesture, and sends operation information relating to the first gesture to the process execution unit 216. When, alternatively, the user fiercely shakes his/her head sideways, the acceleration sensor 118 detects acceleration of a magnitude exceed the threshold value T as illustrated in the range B of FIG. 13. The gesture recognition unit 210 recognizes the gesture as the second gesture, and sends operation information relating to the second gesture to the process execution unit 216.

The process execution unit 216 which has received the operation information relating to the first gesture and the operation information relating to the second gesture executes a different process for each piece of the operation information. For example, the process relating to the first operation information may be a process of inputting "NO" with a usual size and color in the message input operation. On the other hand, the process relating to the second operation information may be a process of inputting "NO" with a size larger than usual and red color in the message input operation. As thus described in the aforementioned example, the user can input a strong negative message by fiercely shaking his/her head.

As has been described above, the user can perform different operations by performing gestures with different strengths. Note that, different operations are not limited to the aforementioned example. In the call application, for example, the process execution unit 216 may execute a "hold-on" operation when the user has performed the first gesture described above. Alternatively, the process execution unit 216 may execute a "hang up" operation when the user has performed the second gesture.

Further, an example has been described above in which the user can perform the first gesture and the second gesture by performing gestures with different strengths. However, there may be set a plurality of the aforementioned threshold values T, for example, different threshold values T1, T2 and T3 in ascending order, so as to allow other different gestures to be recognized. For example, a first gesture may be recognized when acceleration, angular velocity, or angular acceleration which is smaller than the threshold value T1 is detected. Alternatively, a second gesture may be recognized when acceleration angular velocity, or angular acceleration which is larger than the threshold value T1 and smaller than the threshold value T2 is detected. Alternatively, a third gesture may be recognized when acceleration, angular velocity, or angular acceleration which is larger than the threshold value T2 and smaller than the threshold value T3 is detected. Alternatively, a fourth gesture may be recognized when acceleration, angular velocity, or angular acceleration which is larger than the threshold value T3 is detected. As thus described, there may be set a plurality of threshold values for acceleration, angular velocity, or angular acceleration to be detected, allowing a plurality of gesture operations to be recognized in accordance with the set threshold value.

Further, different gesture operations are recognized in accordance with the strength of gestures in the aforementioned example. However different gesture operations may also be recognized in accordance with the number of times a gesture is recognized. For example, it is conceivable that the user shakes his/her head many times when expressing strong negation. Therefore, the process execution unit 216 may execute the process relating to the second gesture when a same gesture has been recognized not less than a predetermined number of times. Alternatively, the process execution unit 216 may execute the process relating to the first gesture when a same gesture has been recognized less than a predetermined number of times. Alternatively, there may be set a plurality of threshold values with regard to the number of times a gesture is detected and a plurality of gesture operations may be recognized in accordance with the number of times of set threshold value.

<<7. An Exemplary Process in which a Timeout Period is Set for Recognizing a Gesture>>

An exemplary process in which an operation of a gesture recognized in accordance with the strength of the recognized gesture varies has been described above. Note that, in the following, there will be described an exemplary process in which a timeout period for recognizing a gesture is set. In gesture recognition, there is a case where the user shakes his/her head sideways for a plurality of times, for example. On this occasion, there is a possibility that, although the user wants to perform an operation once, the operation may be performed for a plurality of times. In the present embodiment a timeout period relating to a gesture recognition is set in order to prevent an operation from being performed against the user's intention.

Figure 14:
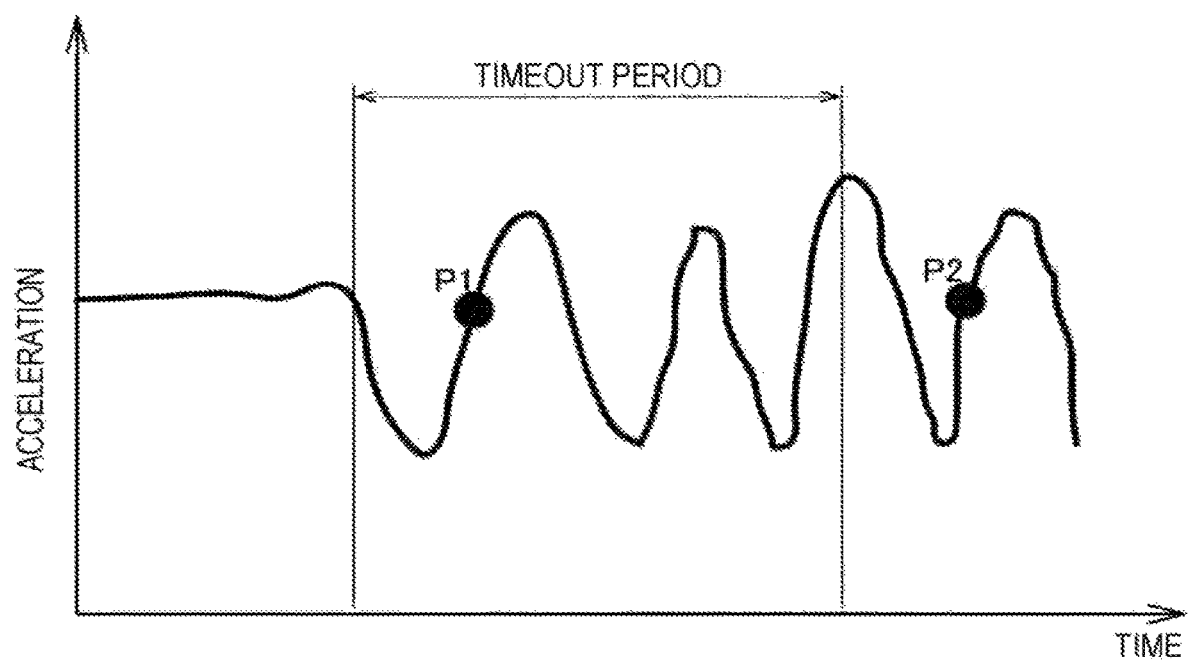
FIG. 14 is a diagram illustrating a timeout period being set for detecting a gesture.

FIG. 14 illustrates a timeout period relating to gesture recognition to be set in the present embodiment. Note that, in the following, there will be described an example in which a gesture is recognized on the basis of acceleration detected by the acceleration sensor 118. In FIG. 14, the user performs a gesture such as shaking his/her head sideways, and thereby the acceleration sensor 118 detects acceleration. The gesture recognition unit 210 starts counting of a timeout period from the time point of detecting the acceleration.

A first-time gesture is then recognized at a time point denoted by P1. Subsequently, a change of acceleration caused by a plurality of times of similar gestures performed by the user is detected. On this occasion, the gesture recognition unit 210 determines whether or not the timeout period has elapsed. When the gesture recognition unit 210 determines that the timeout period has not elapsed, the gesture recognition unit 210 does not recognize gestures performed during the period. Then, after the timeout period has elapsed, the gesture recognition unit 210 starts recognizing a gesture. Accordingly, the gesture recognition unit 210 recognizes a second-time gesture at a time point P2 after the timeout period has elapsed.

As has been described above, setting a timeout period prevents a process from being performed for a number of times unwanted by the user.

<<8. Supplement>>

It should be understood by those skilled in the art that various modifications, combinations, sub-combinations and alterations may occur depending on design requirements and other factors insofar as they are within the scope of the appended claims or the equivalents thereof.

In the aforementioned embodiment, for example, recognition of gestures, recognition of button operations, and recognition of voice operations are performed by the cell-phone 200. However, recognition of gestures, recognition of button operations, and recognition of voice operations may be performed by the server 400. Specifically, the small-size terminal 100 transmits, to the server 400 via a network, signals from the sensor 112, audio signals from the microphone 110, and operation signals of the button 102. The server 400 which has received respective signals processes the received signals to perform recognition of gestures, recognition of button operations and recognition of voice operations. The server 400 then transmits the result of recognition to the small-size terminal 100. The small-size terminal 100 then executes a process to an application in accordance with the received recognition result.

Figure 15:
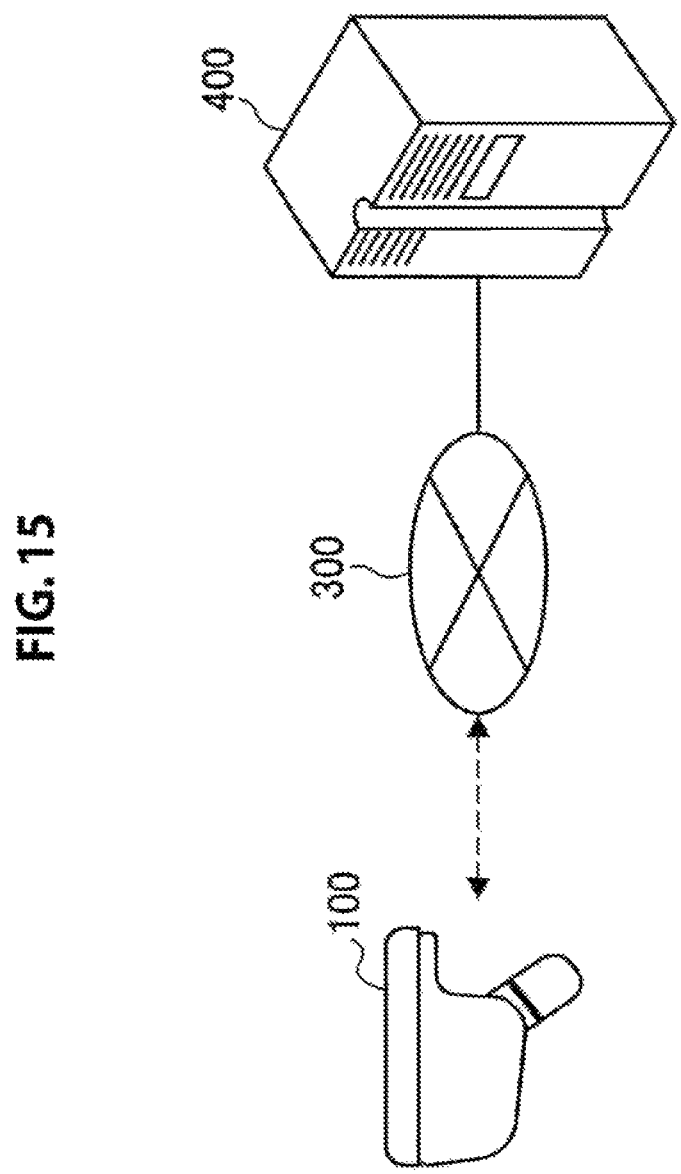
FIG. 15 is a diagram illustrating another exemplary information processing system of an embodiment of the present disclosure.

Alternatively recognition of gestures, recognition of button operations, and recognition of voice operations may be performed by the small-size terminal 100. On this occasion, the processing unit 104 of the small-size terminal 100 processes the signals from respective parts to perform recognition of gestures, recognition of button operations, and recognition of voice operations. The small-size terminal 100 then executes a process to an application in accordance with the received recognition result. The small-size terminal 100 may be configured to execute all the processes as described above. Note that, in the aforementioned example, the small-size terminal 100 may be directly connected to the server 400 via the communication network 300 as illustrated in FIG. 15. Alternatively, the small size terminal 100 may perform gesture recognition and transmit operation information relating to the recognized gesture to the cell-phone 200.

Alternatively, the small-size terminal 100 may calculate a likelihood of gesture recognition and transmit the likelihood to the cell-phone 200, so that the cell-phone 200 may determine the gesture recognition using the likelihood of the gesture recognition calculated by the small-size terminal 100 and a predetermined threshold value. In this example, the small-size terminal 100 and the cell-phone 200 may be connected through a communication path such as Bluetooth Wi-Fi, or a wired network.

The small-size terminal 100 executes a process relating to gesture recognition on the basis of information from the sensor 112, and generates an intermediate result of gesture recognition. When N types of gesture recognition are performed, an exemplary intermediate result may be a data set having listed therein a compatible value (threshold value) for each gesture. For example, when two types of gestures, namely "nod" and "sideways shake" are recognized, the intermediate result may be expressed as "nod:0.8", and "sideways shake:0.2", for example. The intermediate result, which is a pair of a gesture and score generated in the small-size terminal 100, is transmitted to the cell-phone 200. The cell-phone 200 may determine the threshold value in accordance with the setting value, personalized policy for each user, or the situation of the user, the small-size terminal 100, or the cell-phone 200, and determine whether or not to process an operation relating to gesture recognition.

Further, in the aforementioned embodiment, the small-size terminal 100 is an information processing apparatus attached to the user's ear. However, the small-size terminal 100 is not limited thereto. For example, the small-size terminal 100 may be a wristband-type wearable terminal.

In addition, there may be provided a computer program for operating the processing units 104 and 202 in the manner described above. Alternatively, there may be provided a storage medium having such a program stored therein.

<<9. Conclusion>>

As has been discussed above, the sensor 112 is used for gesture recognition in the information processing system according to the embodiment of the present disclosure is activated on the basis of a notification from an application. In addition, the sensor 112 used for gesture recognition is activated in synchronization with a voice operation. As a result, it is possible to reduce power consumption in the small-size terminal 100.

Additionally, the information processing system according to the embodiment of the present disclosure can wait for operations relating to gesture recognition, voice operations, and button operations in parallel. In addition, the user can perform operations combining operations relating to gesture recognition, voice operations, and button operations. Therefore, the user can perform various operations.

In addition, the information processing system according to the embodiment of the present disclosure executes a process of cancelling an operation relating to a once-recognized gesture. Accordingly, the user, even when having performed an erroneous operation, can cancel the operation. In addition, there is dynamically set a cancellation period for accepting a process of canceling air operation relating to a recognized gesture in the information processing system according to the embodiment of the present disclosure. Accordingly, there is set an appropriate cancellation period in accordance with the state or type of the application being executed.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1) An information processing apparatus including:
a voice operation recognition unit configured to recognize voice operations on a basis of information from a voice receiving unit;
a gesture recognition unit configured to recognize user's gestures on a basis of information from a sensor; and
a process execution unit configured to execute processes relating to operations recognized by the voice operation recognition unit and the gesture recognition unit, wherein
the voice operation recognition unit enters a voice operation waiting state in parallel with a gesture waiting state of the gesture recognition unit.

(2) The information processing apparatus according to (1), wherein
the gesture recognition unit enters the gesture waning state in synchronization with entering of the voice operation recognition unit into the voice operation waiting state.

(3) The information processing apparatus according to (2), wherein
the process execution unit executes an application, and
the voice operation recognition unit enters the voice operation waning state on a basis of a notification from the application being executed by the process execution unit.

(4) The information processing apparatus according to any one of (1) to (3), wherein
the process execution unit executes a process relating to an operation recognized by the voice operation recognition unit in preference to an operation recognized by the gesture recognition unit (5) The information processing apparatus according to any one of (1) to (4), further including
an operation-unit-operation recognition unit configured to recognize a user's operation to an operation unit, wherein
the operation-unit-operation recognition unit enters an operation-unit-operation waiting state in parallel with the gesture waiting state of the gesture recognition unit and the voice operation waiting state of the voice operation recognition unit, (6) The information processing apparatus according to (5), wherein
the process execution unit executes a process relating to an operation recognized by the operation-unit-operation recognition unit in preference to an operation recognized by the voice operation recognition unit.

(7) The information processing apparatus according to (5) or (6), wherein
weighting is performed on each of an operation recognized by the gesture recognition unit, an operation recognized by the voice operation recognition unit, and an operation recognized by the operation-unit-operation recognition unit, and
the process execution unit determines a process to be executed preferentially in consideration of the weighting.

(8) The information processing apparatus according to any one of (5) to (7), wherein
the process execution unit executes a process combining at least two of an operation recognized by the gesture recognition unit, an operation recognized by the voice operation recognition unit, and an operation recognized by the operation-unit-operation recognition unit.

(9) The information processing apparatus according to any one of (3) to (8), wherein
a mode of a sensor to be activated is selected in accordance with a notification front the application or a type of the application.

(10) The information processing apparatus according to any one of (3) to (8), wherein
the sensor includes a plurality of sensors, and
a sensor to be activated is selected in accordance with a notification from the application or a type of the application
(11) The information processing apparatus according to any one of (1) to (10), wherein
the sensor is an acceleration sensor or a gyro sensor, and
the gesture recognition unit recognizes a first gesture when acceleration or angular velocity which is smaller than a predetermined value is detected, and recognizes a second gesture when acceleration or angular velocity which is larger than the predetermined value is detected.
(12) The information processing apparatus according to any one of (1) to (11), wherein
the gesture recognition unit recognizes a first gesture when a same gesture is recognized a smaller number of times than a predetermined number of times, and recognizes a second gesture when a same gesture is recognized a larger number of times than the predetermined number of times.
(13) The information processing apparatus according to any one of (1) to (12), wherein
the gesture recognition unit includes
a machine learning determination unit configured to recognize the gesture on a basis of machine learning, and
a rule determination unit configured to recognize the gesture on a basis of a predetermined rule, and
the gesture recognition and recognizes the gesture when both the machine learning determination unit and the rule determination unit recognize the gesture.
(14) An information processing system including:
a voice operation recognition unit configured to recognize voice operations on a basis of information from a voice receiving unit;
a gesture recognition unit configured to recognize user's gestures on a basis of information from a sensor; and
a process execution unit configured to execute processes relating to operations recognized by the voice operation recognition unit and the gesture recognition unit, wherein
the voice operation recognition unit enters a voice operation waiting state in parallel with a gesture waiting state of the gesture recognition unit.
(15) An information processing method including:
recognizing voice operations on a basis of information from a voice receiving unit;
recognizing user's gestures on a basis of information from a sensor; and
executing processes relating to the recognized voice operations and operations relating to the recognized gestures; and
allowing coexistence of a voice operation waiting state in which the voice operation is to be recognized, and a gesture waiting state in which the gesture is to be recognized.

What is claimed is:
1. An information processing apparatus comprising:
processing circuitry configured to
transition to a voice operation waiting state and a gesture operation waiting state in parallel in response to receiving a message,
determine whether a gesture is recognized,
in response to a determination that the gesture is recognized, temporarily store the recognized gesture, and
in response to receiving one or more of a voice operation and a gesture operation, execute processes relating to voice operations or gesture operations based on which of the operations are performed and which of the performed operations is performed earlier.
2. The information processing apparatus according to claim 1, wherein the processing circuitry is further configured to
executes an application, and
enter the voice operation waiting state based on a notification from the application being executed.
3. The information processing apparatus according to claim 1, wherein the processing circuitry is further configured to
execute a process relating to a voice operation in preference to a gesture operation.
4. The information processing apparatus according to claim 1, wherein the processing circuitry is further configured to
recognize a user's operation, and
enter an operation-unit-operation waiting state in parallel with the gesture operation waiting state and the voice operation waiting state.
5. The information processing apparatus according to claim 4, wherein the processing circuitry is further configured to
execute a process relating to an operation-unit operation in preference to the voice operation.
6. The information processing apparatus according to claim 4, wherein
weighting is performed on each of the voice operation, the gesture operation, and the operation-unit operation, and
the processing circuitry is further configured to determine a process to be executed preferentially in consideration of the weighting.
7. The information processing apparatus according to claim 4, wherein the processing circuitry is further configured to
execute a process combining at least two of a gesture operation, a voice operation, and an operation-unit operation.
8. The information processing apparatus according to claim 2, wherein
a mode of a sensor to be activated is selected in accordance with a notification from the application or a type of the application.
9. The information processing apparatus according to claim 2, wherein
the sensor includes a plurality of sensors, and
a sensor to be activated is selected in accordance with a notification from the application or a type of the application.
10. The information processing apparatus according to claim 1, wherein
the sensor is an acceleration sensor or a gyro sensor, and
the processing circuitry is further configured to recognize a first gesture when acceleration or angular velocity which is smaller than a predetermined value is detected, and recognizes a second gesture when acceleration or angular velocity which is larger than the predetermined value is detected.
11. The information processing apparatus according to claim 1, wherein
the processing circuitry is further configured to recognize a first gesture when a same gesture is recognized a smaller number of times than a predetermined number of times, and recognizes a second gesture when a same gesture is recognized a larger number of times than the predetermined number of times.

12. The information processing apparatus according to claim 1, wherein the processing circuitry is further configured to recognize the gesture based on machine learning, and
recognize the gesture based on a predetermined rule, and
recognize the gesture when the gesture is recognized based on the machine learning and the predetermined rule.

13. An information processing system comprising:

processing circuitry configured to transition to a voice operation waiting state and a gesture operation waiting state in parallel in response to receiving a message, determine whether a gesture is recognized, in response to a determination that the gesture is recognized, temporarily store the recognized gesture, and in response to receiving one or more of a voice operation and a gesture operation, execute processes relating to voice operations or gesture operations based on which of the operations are performed and which of the performed operations is performed earlier.

14. An information processing method comprising:

transitioning to a voice operation waiting state and a gesture operation waiting state in parallel in response to receiving a message, determining whether a gesture is recognized, in response to a determination that the gesture is recognized, temporarily storing the recognized gesture, and in response to receiving one or more of a voice operation and a gesture operation, executing processes relating to voice operations or gesture operations based on which of the operations are performed and which of the performed operations is performed earlier.

* * * * *